US011896951B2

United States Patent
Zhao et al.

(10) Patent No.: US 11,896,951 B2
(45) Date of Patent: Feb. 13, 2024

(54) MIXED-METAL STRATEGY FOR THE FAST SYNTHESIS OF METAL-ORGANIC FRAMEWORKS UNDER AMBIENT CONDITIONS

(71) Applicant: National University of Singapore, Singapore (SG)

(72) Inventors: Dan Zhao, Singapore (SG); Shing Bo Peh, Singapore (SG); Avishek Karmakar, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 17/998,510

(22) PCT Filed: Apr. 19, 2021

(86) PCT No.: PCT/SG2021/050222
§ 371 (c)(1),
(2) Date: Nov. 11, 2022

(87) PCT Pub. No.: WO2021/230811
PCT Pub. Date: Nov. 18, 2021

(65) Prior Publication Data
US 2023/0191365 A1 Jun. 22, 2023

(30) Foreign Application Priority Data
May 12, 2020 (SG) .............................. 10202004387T

(51) Int. Cl.
*B01D 53/02* (2006.01)
*B01J 20/22* (2006.01)
*B01D 53/04* (2006.01)
*B01J 20/30* (2006.01)
*C07F 15/06* (2006.01)

(52) U.S. Cl.
CPC ............ *B01J 20/226* (2013.01); *B01D 53/04* (2013.01); *B01J 20/3085* (2013.01); *C07F 15/065* (2013.01); *B01D 2253/204* (2013.01); *B01D 2257/504* (2013.01)

(58) Field of Classification Search
CPC ...... B01J 20/226; B01J 20/3085; B01D 53/04; B01D 2253/204; C07F 15/065
See application file for complete search history.

(56) References Cited

FOREIGN PATENT DOCUMENTS

CN 103920464 A 7/2014

OTHER PUBLICATIONS

Abednatanzi et al. "Mixed-metal metal-organic frameworks" Chemical Society Reviews, 48(9):2535-2565 (2019).
Aizawa et al. "Octahedral-Tetrahedral Equilibrium and Solvent Exchange of Cobalt(II) Ions in Primary Alkylamines" Inorganic Chemistry, 41(17):4555-4559 (2002).
(Continued)

*Primary Examiner* — Christopher P Jones
(74) *Attorney, Agent, or Firm* — Myers Bigel, P.A.

(57) ABSTRACT

Disclosed herein is a metal organic framework (MOF) having a UTSA-16 structure, where the composition comprises: from 0 to 80 mol % of the total metal in the MOF is a first metal selected from one or more of the group consisting of Cr, Mn, Fe, Ni, Cu, and Co; and from 20 to 100 mol % of the total metal in the MOF is a second metal selected from one or more of the group consisting of Cd, Mn, and Zn.

20 Claims, 9 Drawing Sheets

(56) References Cited

OTHER PUBLICATIONS

Figure 1:
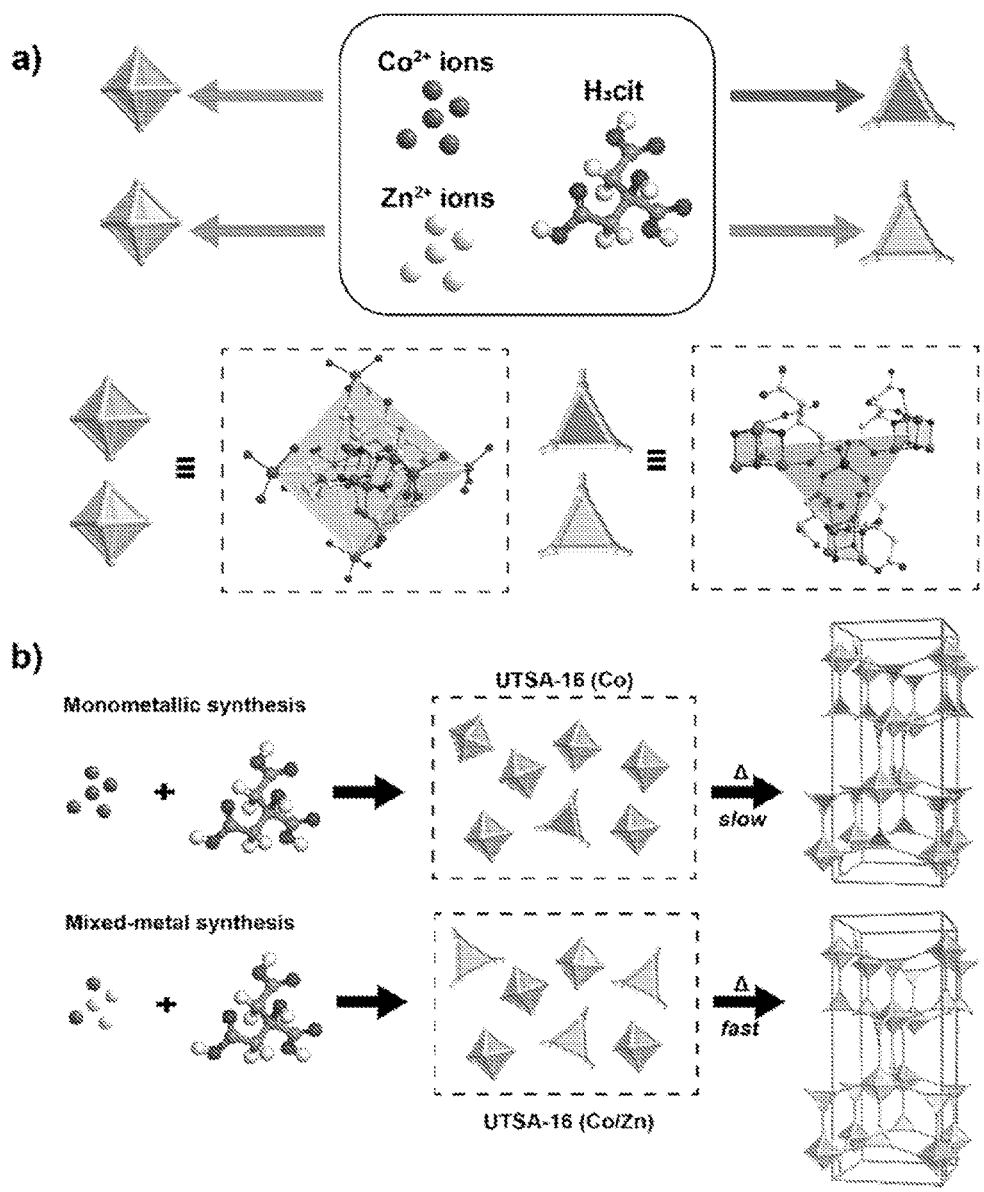

Akesson et al. "Theoretical Study of Water-Exchange Reactions for the Divalent Ions of the First Transition Period" Journal of Physical Chemistry, 97:3765-3774 (1993).
Baker et al. "K- and L-edge X-ray Absorption Spectroscopy (XAS) and Resonant Inelastic X-ray Scattering (RIXS) Determination of Differential Orbital Covalency (DOC) of Transition Metal Sites" Coordination Chemistry Reviews, 345:182-208 (2017).
Ben-Mansour et al. "Carbon capture by physical adsorption: Materials, experimental investigations and numerical modeling and simulations—A review" Applied Energy, 161:225-255 (2016).
Bonneau et al. "Upscale synthesis of a binary pillared layered MOF for hydrocarbon gas storage and separation" Green Chemistry, 22(3):718-724 (2020).
Boot-Handford et al. "Carbon capture and storage update" Energy & Environmental Science, 7:130-189 (2014).
Brozek et al. "Quantification of Site-Specific Cation Exchange in Metal-Organic Frameworks Using Multi-Wavelength Anomalous X-ray Dispersion" Chemistry of Materials, 25(15):2998-3002 (2013).
Cadiau et al. "Design of Hydrophilic Metal Organic Framework Water Adsorbents for Heat Reallocation" Advanced Materials, 27(32):4775-4780 (2015).
Caskey et al. "Selective Metal Substitution for the Preparation of Heterobimetallic Microporous Coordination Polymers" Inorganic Chemistry, 47(18):7942-7944 (2008).
Chevreau et al. "Synthesis of the biocompatible and highly stable MIL-127(Fe): from large scale synthesis to particle size control" CrystEngComm, 18(22):4094-4101 (2016).
Choi et al. "Adsorbent Materials for Carbon Dioxide Capture from Large Anthropogenic Point Sources" ChemSusChem, 2(9):796-854 (2009).
Danaci et al. "Exploring the limits of adsorption-based $CO_2$ capture using MOFs with PVSA—from molecular design to process economics" Molecular Systems Design & Engineering, 5:212-231 (2020).
Datta et al. "$CO_2$ capture from humid flue gases and humid atmosphere using a microporous coppersilicate" Science, 350(6258):302-306 (2015).
Ding et al. "Carbon capture and conversion using metal-organic frameworks and MOF-based materials" Chemical Society Reviews, 48(10):2783-2828 (2019).
Du et al. "XAFCA: a new XAFS beamline for catalysis research" Journal of Synchrotron Radiation, 22(3):839-843 (2015).
Dudev et al. "Tetrahedral vs Octahedral Zinc Complexes with Ligands of Biological Interest: A DFT/CDM Study" Journal of the American Chemical Society, 122(45):11146-11153 (2000).
Dutcher et al. "Amine-Based $CO_2$ Capture Technology Development from the Beginning of 2013—A Review" ACS Applied Materials & Interfaces, 7(4):2137-2148 (2015).
El Osta et al. "Crystallisation Kinetics of Metal Organic Frameworks From in situ Time-Resolved X-ray Diffraction" Powder Diffraction, 28(S2):S256-S275 (2013).
Farrugia, Louis J. "WinGX and ORTEP for Windows: an update" Journal of Applied Crystallography, 45:849-854 (2012).
Farrugia, Louis J. "WinGX suite for small-molecule single-crystal crystallography" Journal of Applied Crystallography, 32(4):837-838 (1999).
Feng et al. "The Chemistry of Multi-component and Hierarchical Framework Compounds" Chemical Society Reviews, 48(18):4823-4853 (2019).
Furukawa et al. "The Chemistry and Applications of Metal-Organic Frameworks" Science, 341(6149):1230444 (2013).
Gaab et al. "The progression of Al-based metal-organic frameworks—From academic research to industrial production and applications" Microporous and Mesoporous Materials, 157:131-136 (2012).
Garzón-Tovar et al. "Optimised room temperature, water-based synthesis of CPO-27-M metal-organic frameworks with high space-time yields" Journal of Materials Chemistry A, 3(41):20819-20826 (2015).
Grande et al. "An efficient recipe for formulation of metal-organic Frameworks" Chemical Engineering Science, 124:154-158 (2015).
Jacomi et al. "pyGAPS: A python-based framework for adsorption isotherm processing and material characterization" Adsorption, 25(8): 1533-1542 (2019).
International Preliminary Report on Patentability corresponding to International Patent Application No. PCT/SG2021/050222 (8 pages) (dated Nov. 24, 2022).
Johnson et al. "Improvements to the production of ZIF-94; a case study in MOF scale-up" Green Chemistry, 21 (20):5665-5670 (2019).
Julien et al. "Metal-organic frameworks meet scalable and sustainable synthesis" Green Chemistry, 19(12):2729-2747 (2017).
Kalmutzki et al. "Secondary building units as the turning point in the development of the reticular chemistry of MOFs" Science Advances, 4(10):eaat9180 (2018).
Katayama et al. "Liquid-Liquid Phase Equilibria of the System Ethanol (1) + Water (2) + Tripotassium Citrate (3)" Journal of Chemical & Engineering Data, 53(8):1940-1943 (2008).
Khurana et al. "Adsorbent Screening for Postcombustion $CO_2$ Capture: A Method Relating Equilibrium Isotherm Characteristics to an Optimum Vacuum Swing Adsorption Process Performance" Industrial & Engineering Chemistry Research, 55(8):2447-2460 (2016).
Krause et al. "Comparison of silver and molybdenum microfocus X-ray sources for single-crystal structure determination" Journal of Applied Crystallography, 48:3-10 (2015).
Krishnamurthy et al. "$CO_2$ Capture from Dry Flue Gas by Vacuum Swing Adsorption: A Pilot Plant Study" AIChE Journal, 60(5):1830-1842 (2014).
Laybourn et al. "Metal-organic frameworks in seconds via selective microwave heating" Journal of Materials Chemistry A, 5(16):7333-7338 (2017).
Lenzen et al. "Scalable Green Synthesis and Full-Scale Test of the Metal-Organic Framework CAU-10-H for Use in Adsorption-Driven Chillers" Advanced Materials, 30(6):1705869 (2018).
Li et al. "Carbon dioxide capture-related gas adsorption and separation in metal-organic frameworks" Coordination Chemistry Reviews, 255(15):1791-1823 (2011).
Li et al. "Recent advances in gas storage and separation using metal organic frameworks" Materials Today, 21 (2):108-121 (2018).
Li et al. "Selective gas adsorption and separation in metal-organic frameworks" Chemical Society Reviews, 38(5):1477-1504 (2009).
Liu et al. "Progress in adsorption-based $CO_2$ capture by metal-organic frameworks" Chemical Society Reviews, 41(6):2308-2322 (2012).
Lomachenko et al. "Exact Stoichiometry of $Ce_xZr_{6-x}$ Cornerstones in Mixed-Metal UiO-66 Metal-Organic Frameworks Revealed by Extended X-ray Absorption Fine Structure Spectroscopy" Journal of the American Chemical Society, 140(50):17379-17383 (2018).
Ma et al. "Dynamics of ligand substitution in labile cobalt complexes resolved by ultrafast T-jump" PNAS, 105(35):12754-12757 (2008).
Masala et al. "$CO_2$ Adsorption Sites in UTSA-16: Multitechnique Approach" The Journal of Physical Chemistry C, 120(22):12068-12074 (2016).
Masala et al. "$CO_2$ Capture in Dry and Wet Conditions in UTSA-16 Metal-Organic Framework" ACS Applied Materials & Interfaces, 9:455-463 (2017).
Masala et al. "New insights into UTSA-16" Physical Chemistry Chemical Physics, 18:220-227 (2016).
Mason et al. "Evaluating metal-organic frameworks for postcombustion carbon dioxide capture via temperature swing adsorption" Energy & Environmental Science, 4(8):3030-3040 (2011).
Mueller et al. "Metal-organic frameworks-prospective industrial applications" Journal of Materials Chemistry, 16(7):626-636 (2006).
Myers et al. "Computer algorithm and graphical method for calculating adsorption equilibria of gas mixtures" Journal of Chemical Engineering of Japan, 19(5):392-396 (1986).
Nugent et al. "Porous materials with optimal adsorption thermodynamics and kinetics for $CO_2$ separation" Nature, 495(7439):80-84 (2013).

(56) References Cited

OTHER PUBLICATIONS

Peh et al. "Scalable and Sustainable Synthesis of Advanced Porous Materials" ACS Sustainable Chemistry & Engineering, 7(4):3647-3670 (2019).
Pyke et al. "Surface and bulk phases in substituted cobalt oxide spinels" Journal of Materials Chemistry, 8(4):1095-1098 (1998).
Ragon et al. "Impact of the Nature of the Organic Spacer on the Crystallization Kinetics of UiO-66(Zr)-Type MOFs" Chemistry—A European Journal, 21(19):7135-7143 (2015).
Ragon et al. "In Situ Energy-Dispersive X-ray Diffraction for the Synthesis Optimization and Scale-up of the Porous Zirconium Terephthalate UiO-66" Inorganic Chemistry, 53(5):2491-2500 (2014).
Ravel et al. "Athena, Artemis, Hephaestus: data analysis for X-ray absorption spectroscopy using IFEFFIT" Journal of Synchrotron Radiation, 12(4):537-541 (2005).
Rehr et al. "Parameter-free calculations of X-ray spectra with FEFF9" Physical Chemistry Chemical Physics, 12(21):5503-5513 (2010).
Rochelle, Gary T. "Amine Scrubbing for $CO_2$ Capture" Science, 325(5948):1652-1654 (2009).
Rulíšek et al. "Coordination geometries of selected transition metal ions ($Co^{2+}$, $Ni^{2+}$, $Cu^{2+}$, $Zn^{2+}$, $Cd^{2+}$, and $Hg^{2+}$) in metalloproteins" Journal of Inorganic Biochemistry, 71(3):115-127 (1998).
Sang et al. "Ionic liquid accelerates the crystallization of Zr-based metal-organic frameworks" Nature Communications, 8:175 (2017).
Sheldrick, George M. "Crystal structure refinement with SHELXL" Acta Crystallographica Section C, 71:3-8 (2015).
Sibille et al. "Site-Dependent Substitutions in Mixed-Metal Metal-Organic Frameworks: A Case Study and Guidelines for Analogous Systems" Chemistry of Materials, 27:133-140 (2015).
Siegelman et al. "Challenges and opportunities for adsorption-based $CO_2$ capture from natural gas combined cycle emissions" Energy & Environmental Science, 12(7):2161-2173 (2019).
Sing et al. Adsorption by Powders and Porous Solids, Rouquerol, F.; Rouquerol, J.; Sing, K., Eds. Academic Press: London, 1999; pp. 165-189.
Spek, Anthony L. "Structure validation in chemical crystallography" Acta Crystallographica Section D, 65(2):148-155 (2009).
Sumida et al. "Carbon Dioxide Capture in Metal-Organic Frameworks" Chemical Reviews, 112(2):724-781 (2012).
Swaddle et al. "Octahedral-tetrahedral equilibria in aqueous cobalt(II) solutions at high temperatures" Canadian Journal of Chemistry, 58(14):1418-1426 (1980).
Tilinin et al. "Quantitative surface analysis by Auger and x-ray photoelectron spectroscopy" Progress in Surface Science, 52(4):193-335 (1996).
Wang et al. "A phase transformable ultrastable titaniumcarboxylate framework for photoconduction" Nature Communications, 9:1660 (2018).
Wang et al. "A robust large-pore zirconium carboxylate metal-organic framework for energy-efficient water-sorption-driven refrigeration" Nature Energy, 3(11):985-993 (2018).
Wang et al. "A robust zirconium amino acid metal-organic framework for proton conduction" Nature Communications, 9:4937 (2018).
Xiang et al. "Microporous metal-organic framework with potential for carbon dioxide capture at ambient conditions" Nature Communications, 3:954 (2012).
Yaghi et al. "Reticular synthesis and the design of new materials" Nature, 423(6941):705-714 (2003).
Zhang et al. "Perspective of microporous metal-organic frameworks for $CO_2$ capture and separation" Energy & Environmental Science, 7(9):2868-2899 (2014).
Calvin et al. "Multiedge refinement of extended x-ray-absorption fine structure of manganese zinc ferrite nanoparticles" Physical Review B, 66(22):224405 (2002).
Xiang et al. "A 3D Canted Antiferromagnetic Porous Metal-Organic Framework with Anatase Topology through Assembly of an Analogue of Polyoxometalate" Journal of the American Chemical Society, 127(47):16352-16353 (2005).
Abdoli et al. "Bimetallic Ni—Co-based metal-organic framework: An open metal site adsorbent for enhancing $CO_2$ capture" Applied Organometallic Chemistry, 33:e5004 (2019).
Gaikwad et al. "Novel metal-organic framework of UTSA-16 (Zn) synthesized by a microwave method: Outstanding performance for $CO_2$ capture with improved stability to acid gases" Journal of Industrial and Engineering Chemistry, 87:250-263 (2020).
International Search Report and the Written Opinion of the International Searching Authority corresponding to International Patent Application No. PCT/SG2021/050222 (5 pages) (dated Jul. 28, 2021).
Peh et al. "Accelerated Formation Kinetics of a Multicomponent Metal-Organic Framework Derived from Preferential Site Occupancy" Inorganic Chemistry, 59:9350-9355 (2020).
Zhang et al. "The fixation of carbon dioxide with epoxides catalyzed by cation-exchanged metal-organic framework" Microporous and Mesoporous Materials, 258:55-61 (2018).

MIXED-METAL STRATEGY FOR THE FAST SYNTHESIS OF METAL-ORGANIC FRAMEWORKS UNDER AMBIENT CONDITIONS

FIELD OF INVENTION

The invention relates to metal organic frameworks (MOFs) having a UTSA-16 structure. In particular, the invention relates to MOFs having good $CO_2$ capture performance, and methods for making the MOFs that are significantly faster under milder reaction conditions.

BACKGROUND

The listing or discussion of a prior-published document in this specification should not necessarily be taken as an acknowledgement that the document is part of the state of the art or is common general knowledge.

Metal-organic frameworks (MOFs) are porous crystalline materials with a modular synthetic chemistry. Due to high compositional tuneability, they are amenable to precise materials engineering allowing excellent performance in numerous commercially interesting applications. For example, certain MOFs have exhibited large $CO_2$ uptake capacities, high $CO_2$ selectivity and prolonged stability making them excellent $CO_2$ capture sorbents. The development of scalable and sustainable protocols is an essential step towards actual commercial applications of MOFs. This is because most intended MOF applications entail large footprints (e.g., ~3000 tonnes sorbent for a capture unit integrated with a 500 MW coal-based power facility). As such, the environmental impact and cost of manufacture substantially affect the overall economic viability of the process.

UTSA-16 is a highly promising MOF material for $CO_2$ capture by adsorption due to the isotherm features, mechanism of adsorption, and stability. Almost all reported syntheses for this material are based on the protocol in *Journal of the American Chemical Society* 2005, 127 (47), 16352-16353, where only the vessel and solvent volume are adjusted to meet the required scale of synthesis. The reported protocol involves mixing the precursor raw materials in 50%/50% ethanol-water mixed solvent, followed by isothermal heating for a fixed duration at 120° C., corresponding to autogenous pressures of 4 to 6 bar. Such solvothermal synthetic approach requires specialized reactors, introducing additional capital costs for production, and precludes the use of common glass equipment, where typical pressure rating is below 2 bar. Ongoing attempts to scale-up this material are hindered by failure to reduce the synthetic temperature below the boiling point of the solvent. In addition, the prevailing protocol also necessitates extended crystallization time (up to 2 days). The reaction efficiency, estimated in terms of space-time yield, is 25 kg $(m^3 \ day)^{-1}$. This needs to be increased by approximately ten-fold to be commercially viable. The ternary phase equilibria of deprotonated ligand salt in solution (i.e., tripotassium citrate+ethanol+water) involves a liquid-liquid phase separation. In the presence of cobalt salt, viscous gelation occurs. It is understood that mixing is detrimentally affected by high viscosity.

Transitioning from a closed-solvothermal condition to open-reflux synthesis with the usage of safe and cheap solvents is an important step towards scalable protocols. Reflux synthesis of MOFs leverages proven manufacturing process technologies and has been demonstrated in the production of an aluminium fumarate MOF at tonne-scale. The capital equipment cost, safety compliance cost and energy cost may all be reduced when a solvothermal process is replaced with a reflux synthetic process.

Reaction optimization of MOFs are highly system-specific. Most of the reported reflux synthetic protocols described for low-valence MOFs and for high-valence MOFs concern binary systems with a single metal precursor and single organic linker. These protocols do not accommodate the synthesis of materials having higher structural complexity. UTSA-16 possesses a unique chemical feature whereby metal species within distinct structural motifs exhibit different coordination geometries. The commonly accepted crystal-field theory predicts that one of these coordination geometries is significantly more favored in terms of stability. This has direct implications for synthesis, because conditions not conducive for the formation of the less stable motif will substantially compromise the kinetics and accordingly, the yield and efficiency of product formation.

There is therefore a need for improved materials and methods which can produce USTA-16 in a faster time under milder reactions, while retaining good $CO_2$ capture performance.

SUMMARY OF INVENTION

It has been surprising found that incorporating a secondary metal component provides UTSA-16 analogues with improved $CO_2$ capture performance that can be formed under significantly milder conditions and in a shorter time. This enables use of conventional laboratory equipment and open-reflux synthesis. The optimized protocols are more compatible with industrial production, paving the way for the mass production of these promising materials.

Aspects and embodiments of the current invention are listed in the following numbered clauses.

1. A metal organic framework (MOF) having a UTSA-16 structure, where the composition comprises:
   from 0 to 80 mol % of the total metal in the MOF is a first metal selected from one or more of the group consisting of Cr, Mn, Fe, Ni, Cu, and Co; and
   from 20 to 100 mol % of the total metal in the MOF is a second metal selected from one or more of the group consisting of Cd, Mn, and Zn.

2. The MOF according to Clause 1, wherein the second metal is Zn.

3. The MOF according to Clause 1 or Clause 2, wherein the second metal is present in an amount of from 25 to 100 mol % of the total metal present in the MOF.

4. The MOF according to Clause 3, wherein the second metal is present in an amount of from 50 to 75 mol % of the total metal present in the MOF.

5. The MOF according to any one of the preceding clauses, wherein the first metal is selected from Fe and Co.

6. The MOF according to Clause 5, wherein the first metal is Co.

7. The MOF according to any one of the preceding clauses, wherein the first metal is present in an amount of from 25 to 50 mol % of the total metal present in the MOF.

8. The MOF according to any one of the preceding clauses, wherein the second metal preferentially occupies a tetrahedral metal site within the MOF.

9. The MOF according to any one of the preceding clauses, wherein the majority of the first metal, when present, occupies an octahedral metal site within the MOF.

10. The MOF according to any one of the preceding clauses, wherein the first metal, when present, and second metal preferentially occupy an octahedral metal site and a tetrahedral metal site within the MOF, respectively.

11. The MOF according to any one of the preceding clauses, wherein the MOF has a saturated $CO_2$ uptake of up to 5.0 mmol/g, optionally wherein the MOF has a saturated $CO_2$ uptake of from 2.5 to 4.5 mmol/g, such as from 3.39 to 3.50 mmol/g.

12. The MOF according to any one of the preceding clauses, wherein the MOF has a breakthrough $CO_2$ working capacity of up to 2.2 mmol/g, such as from 1.0 to 1.8 mmol/g, such as from 1.65 to 1.70 mmol/g.

13. A method of forming a MOF according to any one of the preceding clauses, wherein the method comprises the step of aging a mixture comprising from a first metal precursor, a second metal precursor, a base, citric acid, a first solvent and a second solvent for a period of time at a temperature of from 15 to 200° C., wherein:
the first metal precursor is selected from one or more of the group consisting of Cr, Mn, Fe, Ni, Cu, and Co;
the second metal precursor selected from one or more of the group consisting of Cd, Mn, and Zn; and
the metal in the first metal precursor is present in an amount of from 0 to 80 mol % of the total amount of metal in the mixture; and
the metal in the second metal precursor is present in an amount of from 20 to 100 mol % of the total amount of metal in the mixture.

14. The method according to Clause 13, wherein the temperature is from 20 to 150° C.

15. The method according to Clause 14, wherein the temperature is from 40 to 120° C., such as temperature of from 60 to 80° C.

16. The method according to Clause 15, wherein the temperature used results in one or both solvents being refluxed.

17. The method according to any one of Clauses 13 to 16, wherein:
(a) the first solvent is water and the second solvent is an alkyl alcohol (e.g. the alkyl alcohol is methanol, a propanol or, more particularly, ethanol); and/or
(b) the base is a metal hydroxide (e.g. the base is KOH); and/or
(c) the method is performed under ambient atmospheric conditions (e.g. standard pressure).

18. The method according to any one of Clauses 13 to 17, wherein the first and second metal precursors are a metal salt, where the metal is in a cationic form, which is balanced by one or more counterions selected from one or more of halide (e.g. chloride), nitrate, sulfate, hydroxide, oxide, acetate anion, and hydrates thereof.

19. The method according to any one of Clauses 13 to 18, wherein:
(a) the second metal precursor is $Zn(OAc)_2$ or a hydrate thereof (e.g. $Zn(OAc)_2 \cdot 2H_2O$); and/or
(b) the metal in the second metal precursor is present in an amount of from 25 to 100 mol %, such as from 50 to 75 mol % of the total metal present in the mixture.

20. The method according to any one of Clauses 13 to 19, wherein:
(a) the first metal precursor is $Fe(OAc)_2$, $Co(OAc)_2$ or hydrates thereof (e.g. $Co(OAc)_2 \cdot 4H_2O$); and/or
(b) the metal in the first metal precursor is present in an amount of from 25 to 50 mol %, such as from 50 to 75 mol %, such as from 25 to 50 mol % of the total metal present in the mixture.

21. A method of capturing $CO_2$ comprising the step of exposing a material comprising a MOF as described in any one of Clauses 1 to 12 to an environment containing $CO_2$.

DRAWINGS

FIG. 1. (a) Representation of inorganic building units within UTSA-16 and their respective formation tendencies when using different metal precursors. (b) Representation of monometallic and mixed-metal synthetic approaches for the synthesis of UTSA-16 with different formation kinetics.

Figure 2:
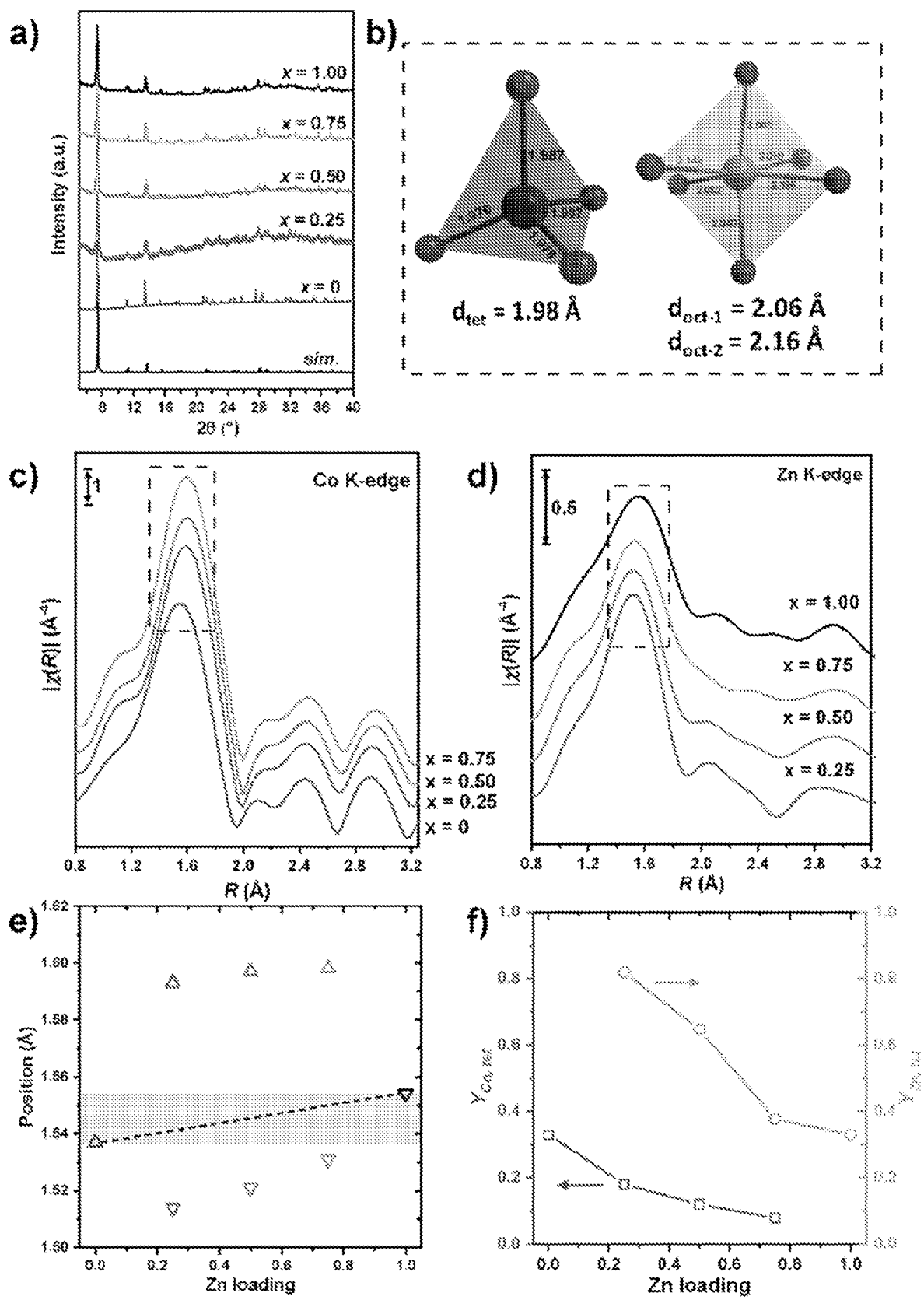

FIG. 2. (a) PXRD patterns of mixed-metal UTSA-16-type MOFs with varying Zn loadings (x represents the feed molar fraction of Zn in mixed Zn/Co precursors). (b) Reported Co—O bond distances of tetrahedral and octahedral Co motifs in UTSA-16. Fourier transforms of $k^3$-weighted EXAFS data collected at Co K-edge (c) and Zn K-edge (d). (e) Position of first peak maxima of FT-EXAFS data as a function of Zn loading x. Up-facing triangle: data from Co K-edge. Down-facing triangle: data from Zn K-edge. (f) The fraction of either metallic species occupying the tetrahedral sites, $Y_{Co,tet}$ and $Y_{Zn,tet}$, as a function of Zn loading x. Note that $Y_{Co,tet}(x=0)$ and $Y_{Zn,tet}(x=1)$ are 0.33 based on SCXRD data.

Figure 3:
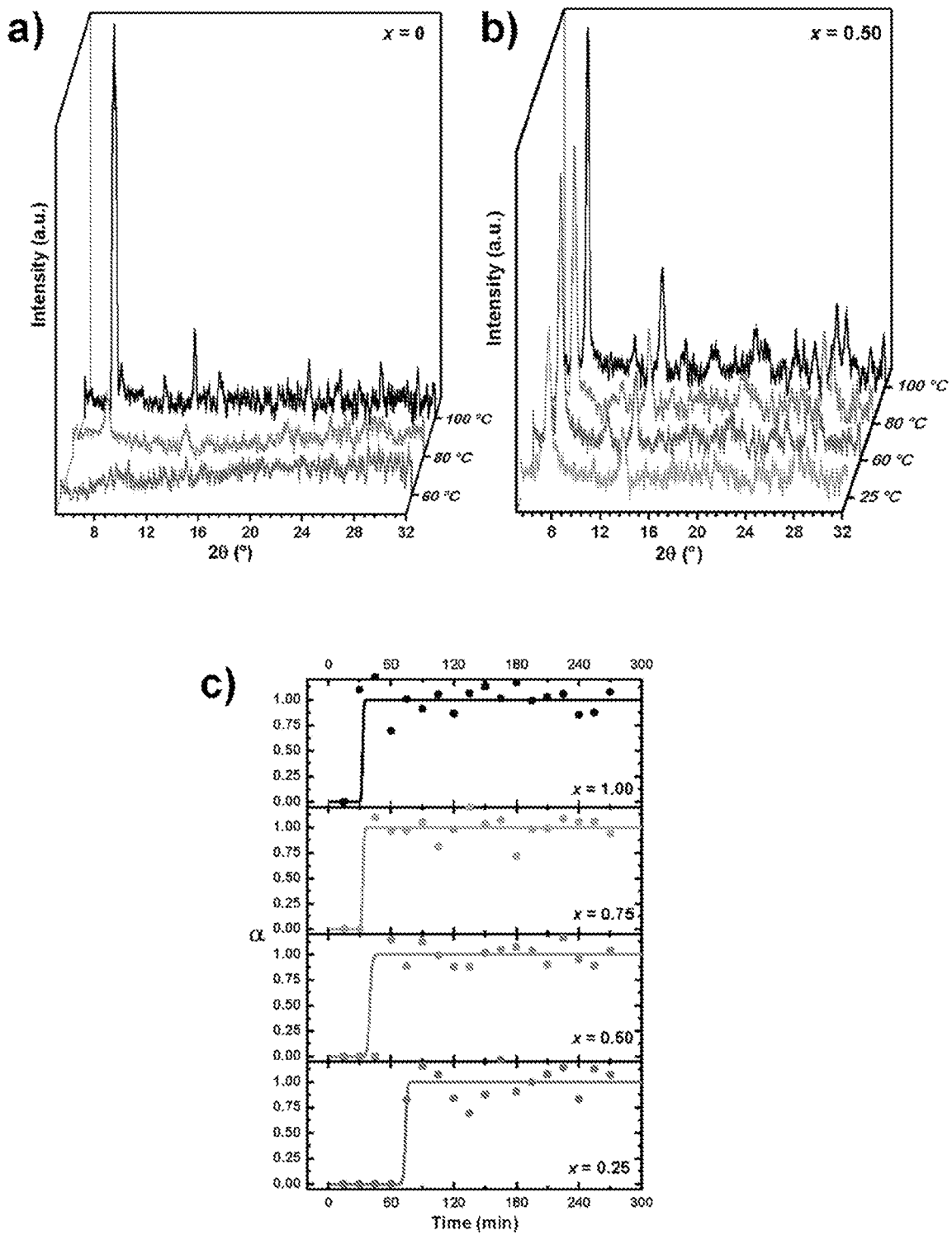

FIG. 3. (a) PXRD patterns of UTSA-16-Zn-0 obtained after incubation for 24 h at various temperatures. (b) PXRD patterns of UTSA-16-Zn-0.50 obtained after incubation for 24 h at various temperatures. (c) Growth kinetics of UTSA-16-Zn-x based on ex-situ experiments. Sigmoidal fit (solid line) is presented to guide the eye.

Figure 4:
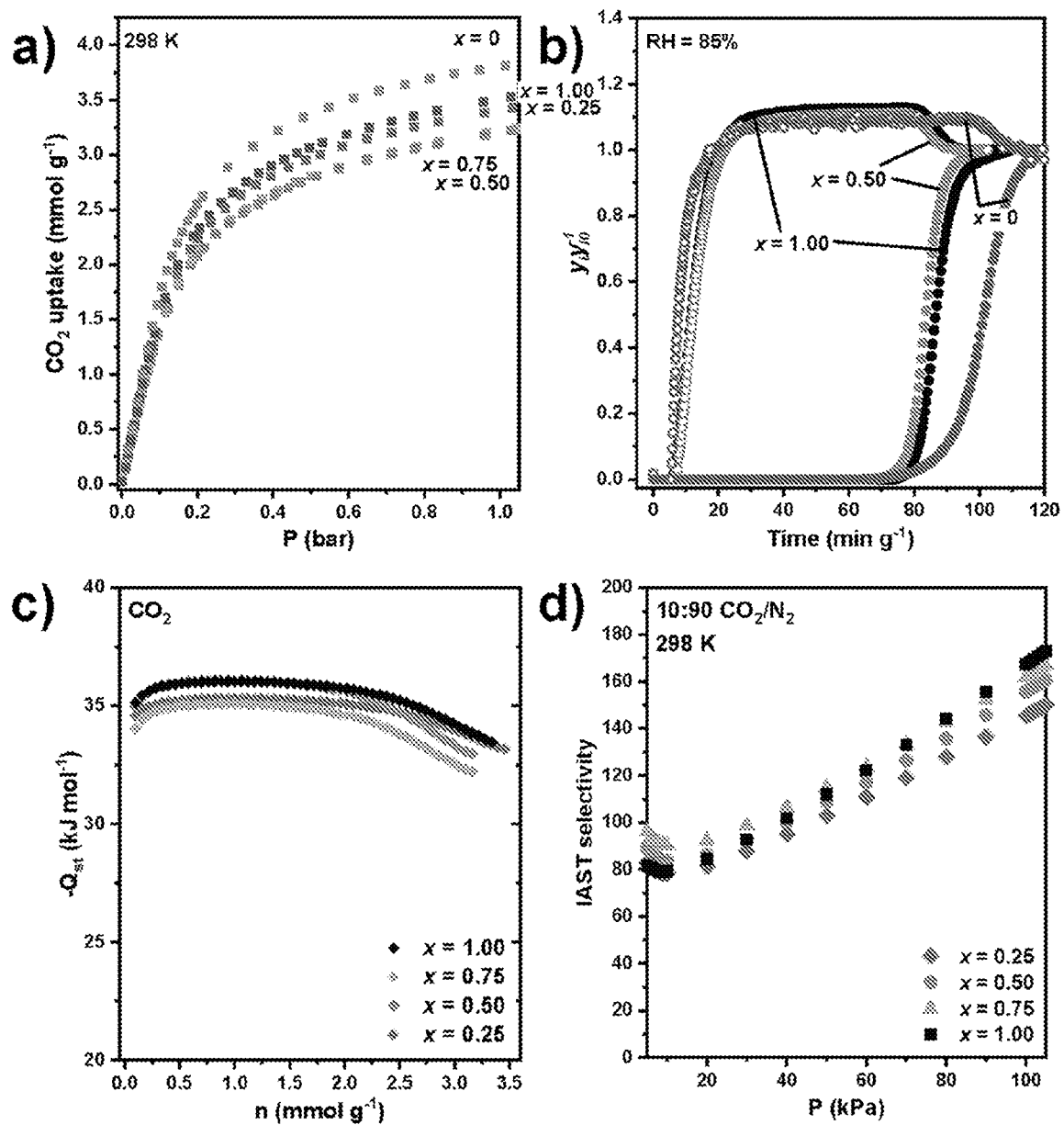

FIG. 4. (a) $CO_2$ isotherms at 298 K of UTSA-16-Zn-x. (b) Wet $CO_2$ (relative humidity: 85%) breakthrough curves at 298 K of UTSA-16-Zn-x. (c) Isosteric heat of $CO_2$ adsorption of UTSA-16-Zn-x. (d) IAST selectivity of UTSA-16-Zn-x for 10:90 $OO_2/N_2$ mixed gas at 298 K under varying feed pressures.

Figure 5:
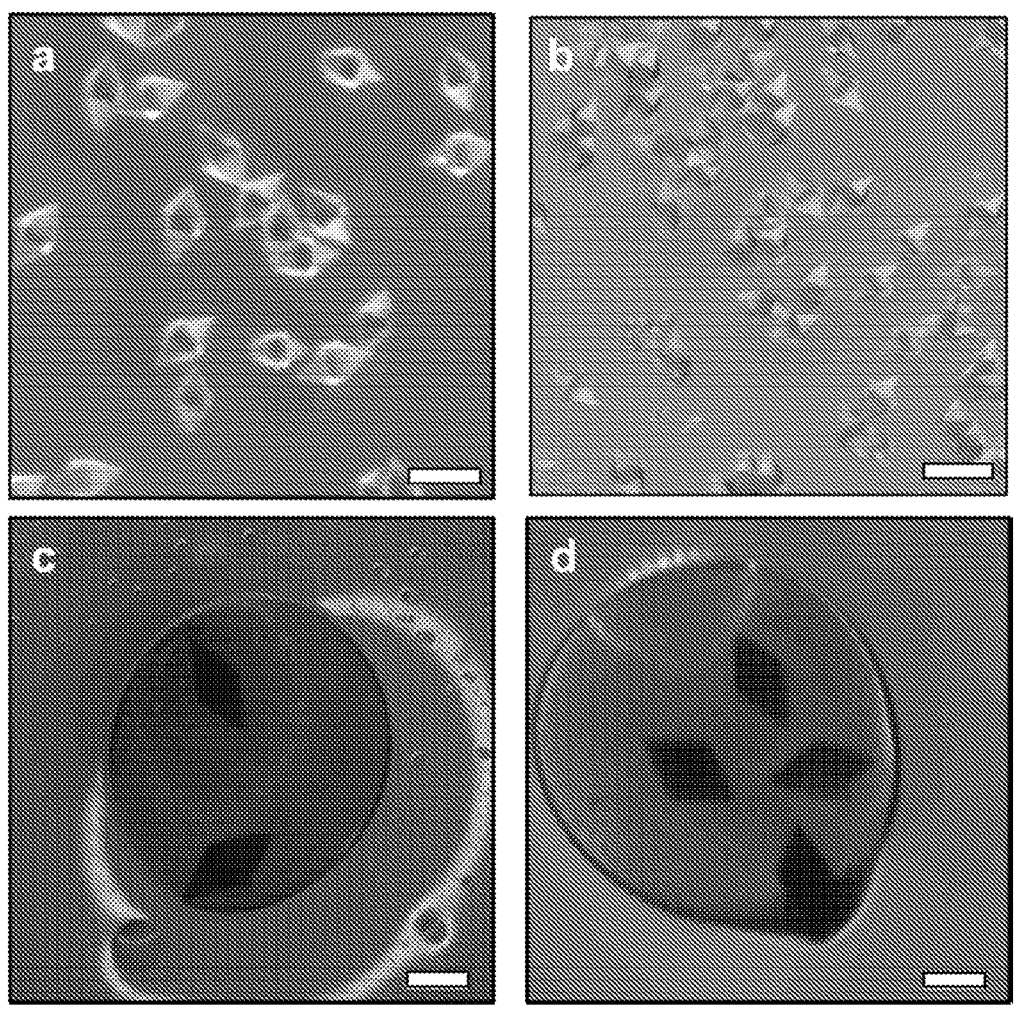

FIG. 5. Optical micrographs of UTSA-16-Zn-0.25. (a,b, scale bar: 50 μm) and UTSA-16(Co) (c,d, scale bar: 200 μm). The droplet is liquid/gel of relatively high viscosity.

Figure 6:
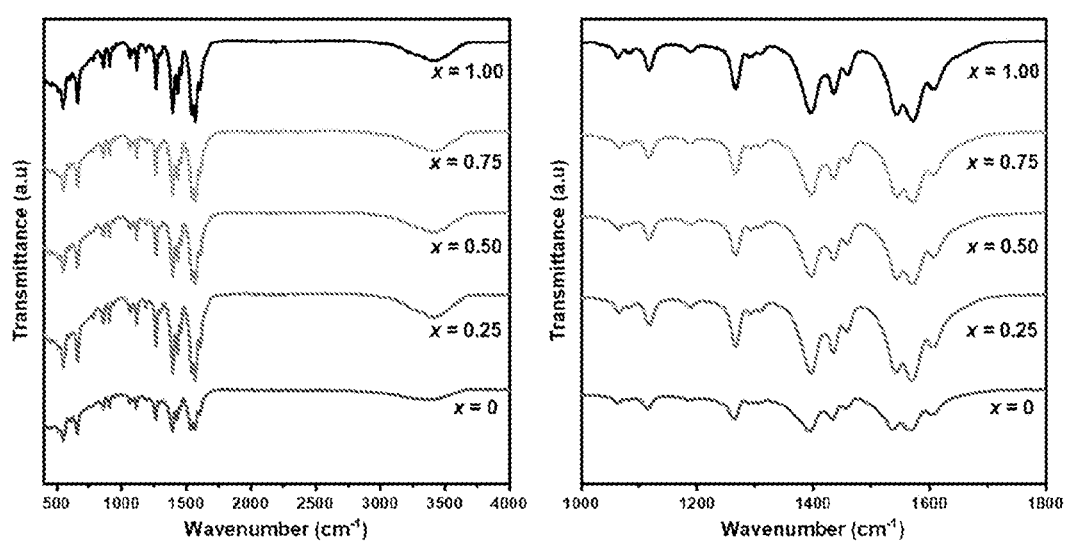

FIG. 6. FTIR spectra of UTSA-16-Zn-x: 400-4000 $cm^{-1}$ (left) and 1000-1800 $cm^{-1}$ (right).

Figure 7:
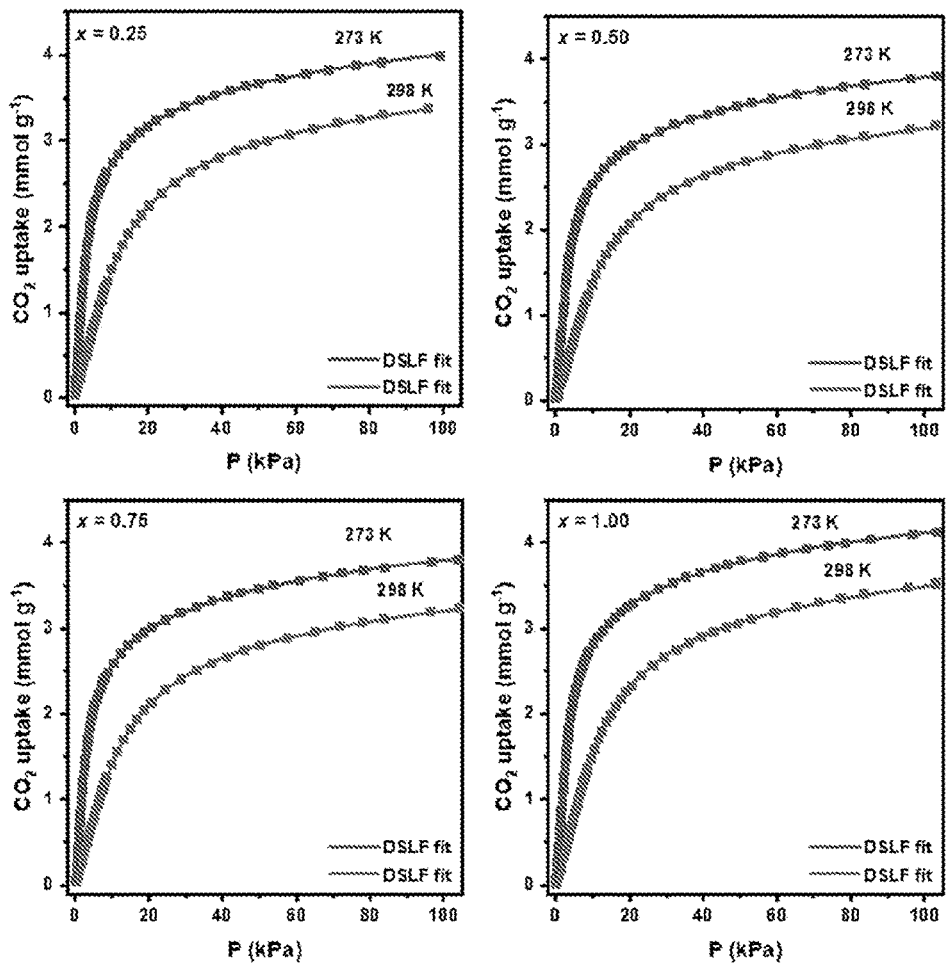

FIG. 7. DSLF fits of $CO_2$ isotherms at 273 and 298 K for UTSA-16-Zn-x materials.

Figure 8:
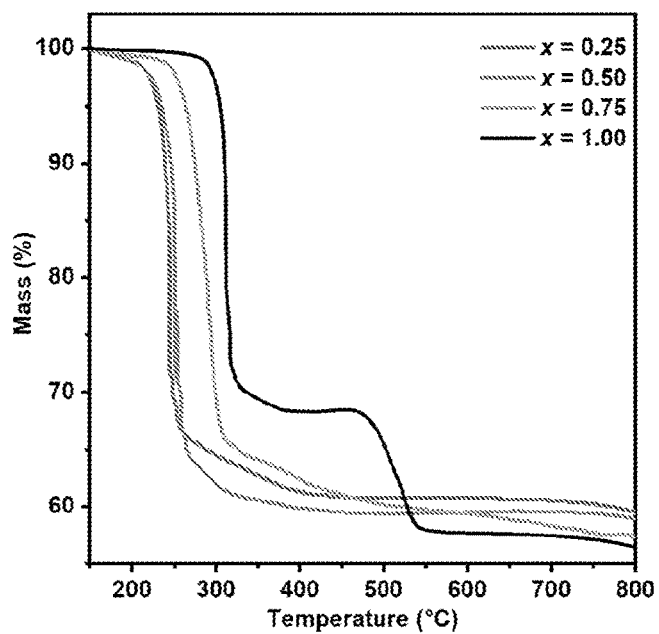

FIG. 8. Comparison of TGA thermograms (recorded in air, 150-800° C., heating rate of 5° C./min) for UTSA-16-Zn-x materials.

Figure 9:
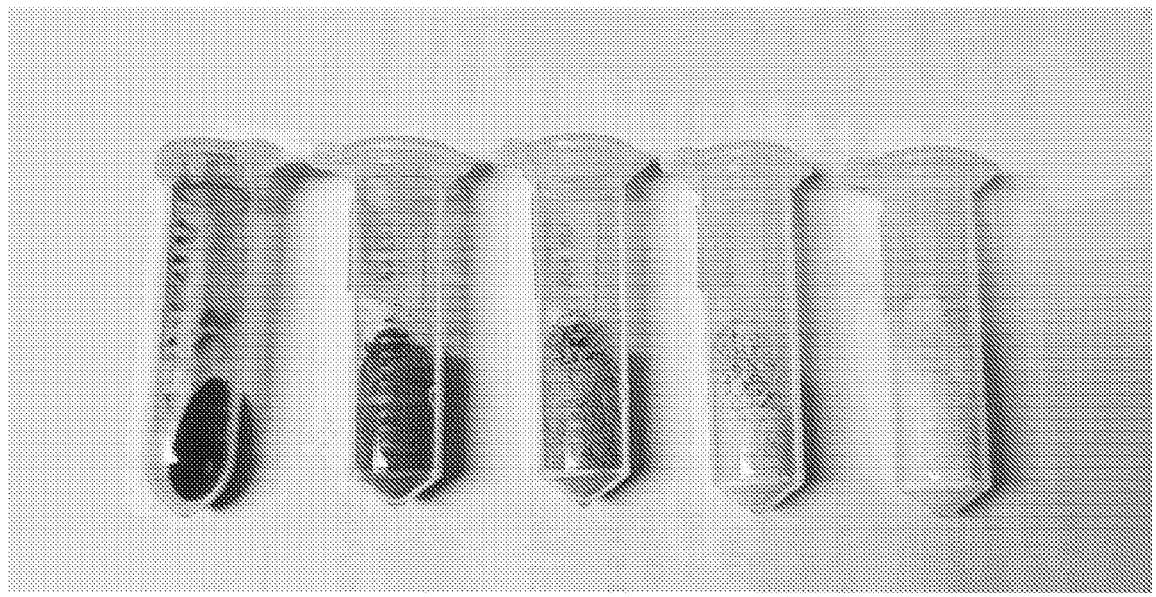

FIG. 9. Photograph of UTSA-16-Zn-x against white A4 paper: (from left to right) x=0 (pure Co), 0.25, 0.50, 0.75, 1.00 (pure Zn).

Figure 10:
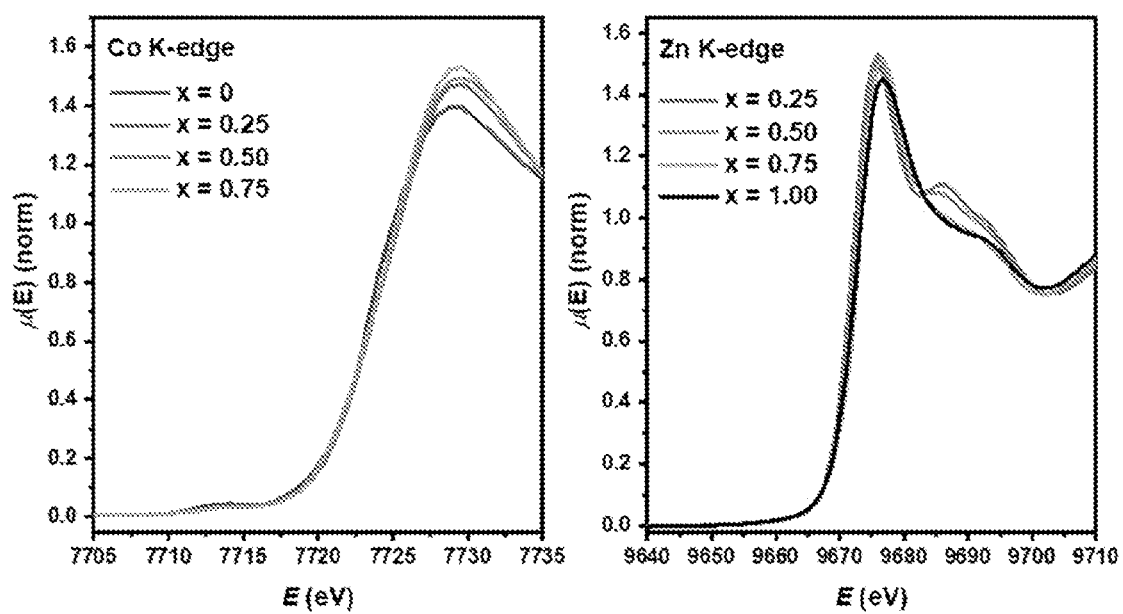

FIG. 10. Co K-edge and Zn K-edge XANES spectra of bimetallic UTSA-16-Zn-x materials.

Figure 11:
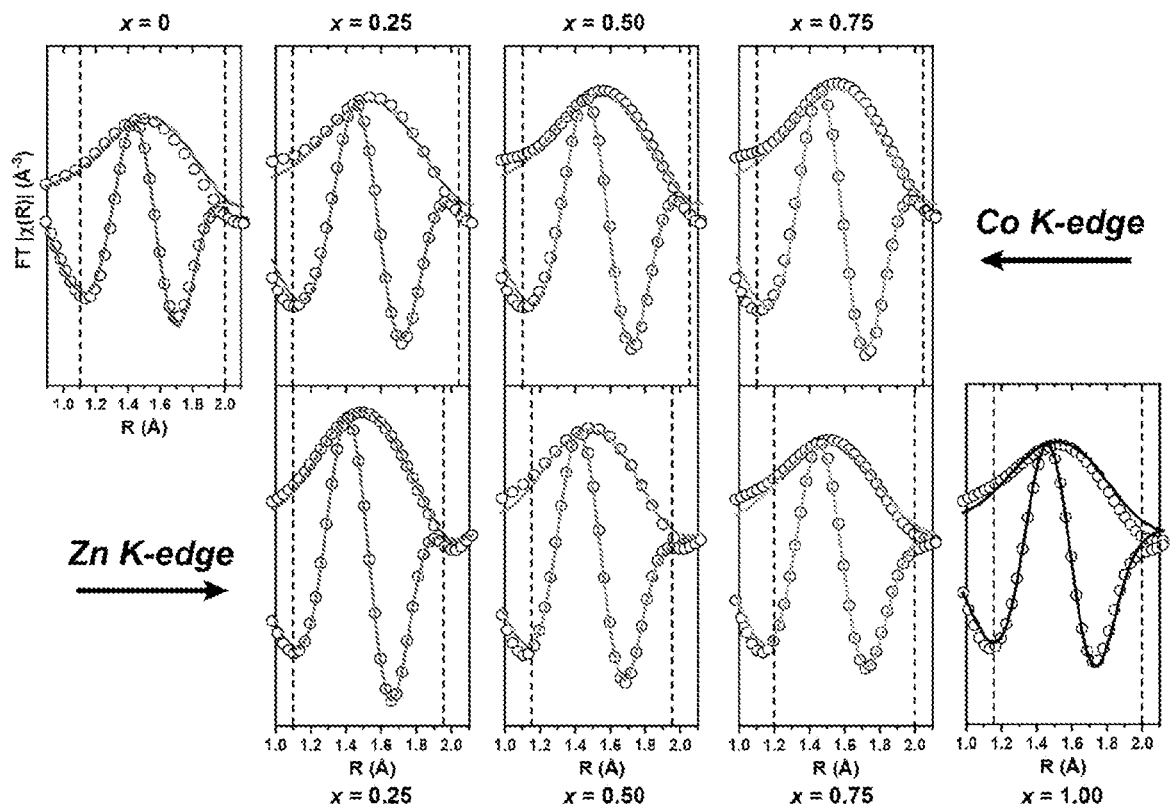

FIG. 11. Results of the EXAFS fitting. Experimental data are shown as white circles, fitted curves are presented as full lines.

Figure 12:
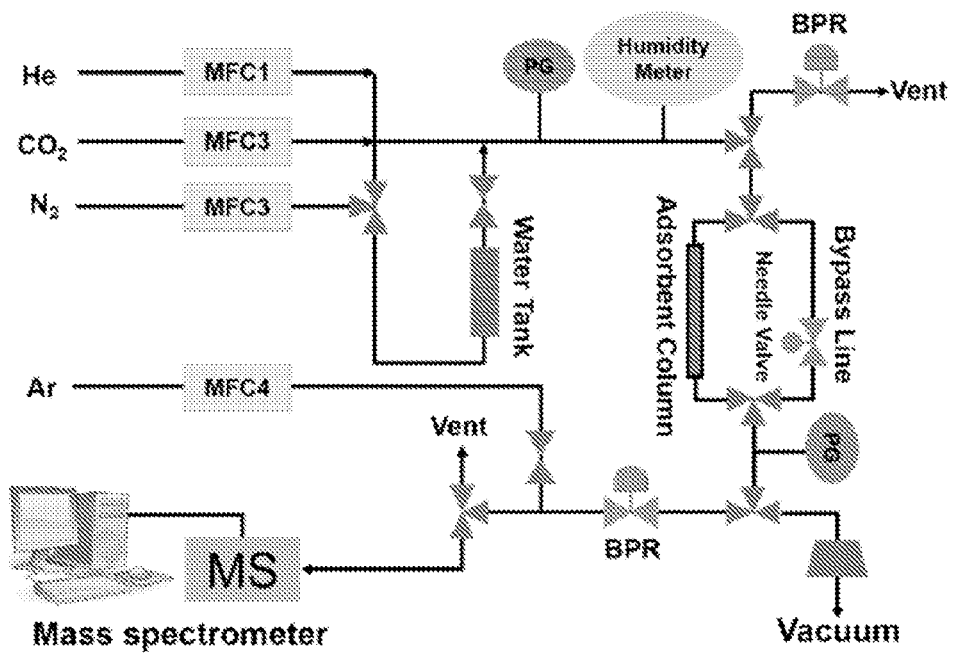

FIG. 12. Scheme of home-built breakthrough setup used in this study.

Figure 13:
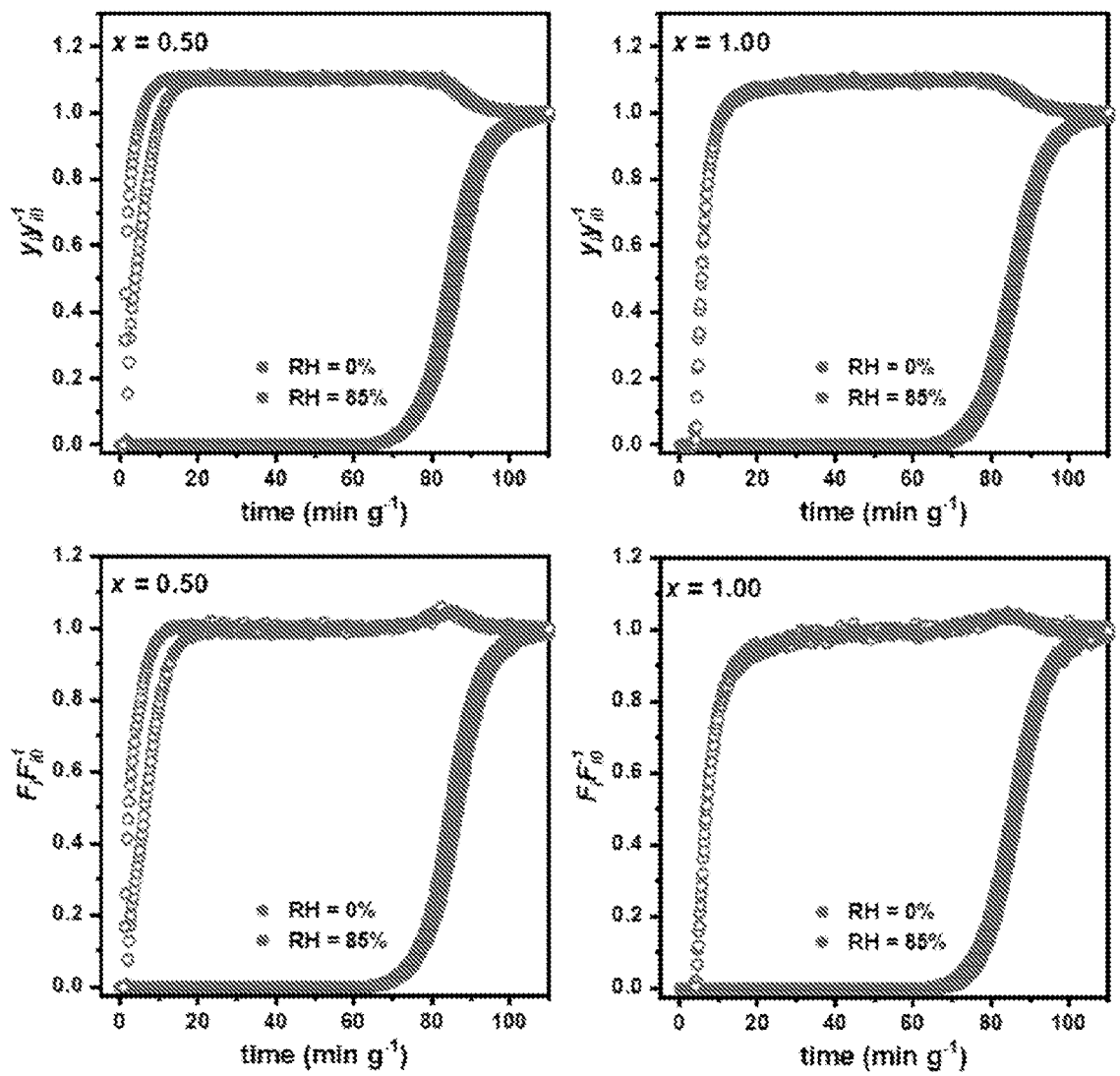

FIG. 13. Uncorrected breakthrough curves for UTSA-16-Zn-x materials under different conditions. Empty symbols—$N_2$, filled symbols—$CO_2$.

DESCRIPTION

It has been surprising found that incorporating a second metal as described herein provides mixed-metal UTSA-16 analogues that can be prepared under milder conditions relative to monometallic UTSA-16. These compounds possess an asymmetric site distribution of the first metal and second metal, and benefit from expanded reaction space and faster reaction kinetics. Additionally, the material disclosed herein may have improved gas separation properties and the underlying structure of UTSA-16 is maintained.

Thus, in a first aspect of the invention, there is provided a metal organic framework (MOF) having a UTSA-16 structure, where the composition comprises:

from 0 to 80 mol % of the total metal in the MOF is a first metal selected from one or more of the group consisting of Cr, Mn, Fe, Ni, Cu, and Co; and from 20 to 100 mol % of the total metal in the MOF is a second metal selected from one or more of the group consisting of Cd, Mn, and Zn.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

The phrase, "consists essentially of" and its pseudonyms may be interpreted herein to refer to a material where minor impurities may be present. For example, the material may be greater than or equal to 90% pure, such as greater than 95% pure, such as greater than 97% pure, such as greater than 99% pure, such as greater than 99.9% pure, such as greater than 99.99% pure, such as greater than 99.999% pure, such as 100% pure.

When used herein, the USTA-16 structure is taken to mean that the MOFs disclosed herein share a similar structure to that disclosed in the microporous cobalt citrate framework USTA-16 (University of Texas at San Antonio-16). However, for the avoidance of doubt, the compounds disclosed here use different constituent components.

As noted above, the first metal, when present, may be selected from one or more of the group consisting of Cr, Mn, Fe, Ni, Cu, and Co. For example, the first metal (when present) may be selected from one or both of Fe and Co or, more particularly, the first metal (when present) may be Co. As will be appreciated from the above, the first metal may or may not be present in the MOFs of the current invention. When the MOF is present, the first metal may represent up to 80 mol % of the total metal in the MOF. In particular embodiments of the invention when the first metal is present, it may represent from 25 to 50 mol % of the total metal present in the MOF.

As noted herein, the second metal may be selected from one or more of the group consisting of Cd, Mn, and Zn. In more particular embodiments that may be mentioned herein, the second metal may be Zn.

As will be appreciated, the second metal may be the only metal present in the MOF (i.e. the first metal represents 0 mol % and the second metal represents 100 mol % of the total metal in the MOF), but it may more typically be present in combination with the first metal. Thus, in embodiments of the invention, the second metal may represent from 20 to 80 mol %, such as from 25 to 100 mol %, such as from 50 to 75 mol % of the total metal in the MOF.

Thus, in embodiments of the invention, the MOF may contain:

(a) 0 mol % of the first metal and 100 mol % of the second metal;

(b) 25 mol % of the first metal and 75 mol % of the second metal;

(c) 50 mol % of the first metal and 50 mol % of the second metal;

(d) 75 mol % of the first metal and 25 mol % of the second metal; and (e) 80 mol % of the first metal and 20 mol % of the second metal, where 100 mol % represents the total metal in the MOF.

In microporous cobalt citrate framework USTA-16, there are tetrameric $[Co_4]$ clusters and monomeric $[Co(O_2CR)_4]$ units, where the Co(II) species adopt octahedral and tetrahedral coordination environments, respectively.

In embodiments of the invention where only the second metal is present, then by analogy, the second metal will occupy both the octahedral and tetrahedral coordination environments. However, when the first metal is also present, the second metal will preferentially occupy tetrahedral metal sites within the MOF. For example, the majority of the second metal may occupy a tetrahedral metal site within the MOF. When used herein "majority" may mean 51 mol % of the second metal, such as 55 mol %, 60 mol % 70 mol, 75 mol %, 80 mol %, 85 mol %, 90 mol %, 95 mol %, or 99 mol % occupies the tetrahedral metal sites.

Similarly, when only a small amount of the second metal is present (e.g. 20 mol %), then the first metal may occupy both the octahedral and tetrahedral coordination environments. However, the first metal may display a preferential occupation of the octahedral metal sites. For example, the majority of the first metal, when present, may occupy an octahedral metal site within the MOF. When used herein "majority" may mean 51 mol % of the first metal, such as 55 mol %, 60 mol % 70 mol, 75 mol %, 80 mol %, 85 mol %, 90 mol %, 95 mol %, or 99 mol % occupies the octahedral metal sites.

Thus, in embodiments of the invention, where both the first and second metals are present, then the first metal and second metal preferentially occupy an octahedral metal site and a tetrahedral metal site within the MOF, respectively.

For example, when there is a 50:50 mixture of Zn and Co as the second and first metals, respectively, then 65 mol % of Zn may occupy the tetrahedral metal sites. Further, when there is a 25:75 mixture of Zn and Co as the second and first metals, respectively, then 82 mol % of Zn may occupy the tetrahedral metal sites.

The MOFs disclosed herein may have a specific surface area of from 300 to 1500 $m^2g^{-1}$, such as from 500 to 1000 $m^2g^{-1}$, such as from 691 to 863 $m^2g^{-1}$. The MOFs disclosed herein may be useful in $CO_2$ capture. As such, the MOFs of the current invention may display a saturated $CO_2$ uptake of up to 5.0 mmol/g, optionally wherein the MOF has a saturated $CO_2$ uptake of from 2.5 to 4.5 mmol/g, such as from 3.39 to 3.50 mmol/g. Additionally or alternatively, the MOFs of the current invention may have a breakthrough $CO_2$ working capacity of up to 2.2 mmol/g, such as from 1.0 to 1.8 mmol/g, such as from 1.65 to 1.70 mmol/g.

The MOFs disclosed herein may be conveniently prepared. As mentioned, the MOFs disclosed herein may be formed under milder conditions (such as lower temperature or pressure). Thus, in a second aspect of the invention, there is provided a method of forming a MOF as described herein, wherein the method comprises the step of aging a mixture comprising from a first metal precursor, a second metal precursor, a base, citric acid, a first solvent and a second solvent for a period of time at a temperature of from 15 to 200° C., wherein:

the first metal precursor is selected from one or more of the group consisting of Cr, Mn, Fe, Ni, Cu, and Co;

the second metal precursor selected from one or more of the group consisting of Cd, Mn, and Zn; and the metal in the first metal precursor is present in an amount of from 0 to 80 mol % of the total amount of metal in the mixture; and the metal in the second metal precursor is present in an amount of from 20 to 100 mol % of the total amount of metal in the mixture.

Any suitable temperature in the range of from 15 to 200° C. may be used. For example, the temperature may be from 20 to 150° C., such as from 40 to 120° C., such as temperature of from 60 to 80° C. In another embodiment, the temperature may be room temperature (that is, from 20 to 30° C., such as temperature of about 25° C.).

As noted above, the method makes use of a first and second solvent. As such, the temperature used in the preparation may result in one or both solvents being refluxed. The use of a reflux synthetic process as compared to a solvothermal process may reduce equipment cost, safety compliance cost and energy cost.

Any suitable solvents may be used as the first and second solvent. For example, the first solvent may be water and the second solvent may be an alkyl alcohol (e.g. the alkyl alcohol is methanol, a propanol or, more particularly, ethanol).

Any suitable base may be used in the method disclosed herein. For example, the base may be a metal hydroxide (e.g. the base is KOH).

The method above may be performed under any suitable pressure. For example, the method may be performed under ambient atmospheric conditions (e.g. standard pressure). Again, this may reduce costs associated with the preparation of the MOF.

Any suitable chemical can be used as the first and second metal precursors. As will be appreciated, the chemicals selected will need to include the first and/or second metal to be able to act as a precursor. In embodiments of the invention that may be mentioned herein, the first and second metal precursors may be a metal salt, where the metal is in a cationic form, which is balanced by one or more counterions selected from one or more of halide (e.g. chloride), nitrate, sulfate, hydroxide, oxide, acetate anion, and hydrates thereof.

In particular embodiments that may be mentioned herein, the second metal precursor may be $Zn(OAc)_2$ or a hydrate thereof (e.g. $Zn(OAc)_2 \cdot 2H_2O$). Additionally or alternatively, the metal in the second metal precursor may be present in an amount of from 25 to 100 mol %, such as from 50 to 75 mol % of the total metal present in the mixture.

In particular embodiments that may be mentioned herein, the first metal precursor is $Fe(OAc)_2$, $Co(OAc)_2$ or hydrates thereof (e.g. $Co(OAc)_2 \cdot 4H_2O$). Additionally or alternatively, the metal in the first metal precursor may be present in an amount of from 25 to 50 mol %, such as from 50 to 75 mol %, such as from 25 to 50 mol % of the total metal present in the mixture.

As noted above, the MOF disclosed herein may be useful in capturing $CO_2$. Thus, in a third aspect of the invention, there is provided a method of capturing $CO_2$ comprising the step of exposing a material comprising a MOF as described herein to an environment containing $CO_2$.

Further aspects and embodiments of the invention will now be described by reference to the following non-limiting examples.

EXAMPLES

Pristine UTSA-16(Co) contains tetrameric $[Co_4]$ clusters and monomeric $[Co(O_2CR)_4]$ units coexisting in the framework, wherein $Co^{II}$ species adopt octahedral and tetrahedral coordination environments, respectively. In turn, these units form nodes with octahedral and trigonal connectivity, resulting in an anatase-type net. According to the crystal-field theory, the presence of weak-field ligands such as carboxylate and solvent molecules heavily prefers $Co^{II}$ in octahedral coordination. As a result, the low thermodynamic stability of tetrahedral $Co^{II}$ under the prevailing reaction conditions may reduce the driving force for the formation of the corresponding $[Co(O_2CR)_4]$ motif, and in turn, kinetically limit the formation process of this material (FIG. 1a). We hypothesized that the inclusion of $Zn^{II}$ as the secondary metal component may generate a structurally analogous $[Zn(O_2CR)_4]$ motif in the framework, because $Zn^{II}$ is known to exhibit tetrahedral geometry in several systems. In a mixed-metal formulation, the one-pot combination of the two metal sources may favor the formation of $[Co_4]$ and $[Zn(O_2CR)_4]$ due to their specific coordination preference. Importantly, cationic partitioning can decouple the formation rates of the two motifs from the octahedral-tetrahedral equilibria of the individual precursors, culminating in accelerated formation kinetics of the MOFs (FIG. 1b). As such, mixed-metal formulations were prepared and analyzed.

Materials and Methods

All the reagents were obtained from commercial sources and used without further purification. Ultrapure water was used as supplied from $PU^+$ purification system (VWR).

TABLE 1

List of chemicals

| Chemical | Source |
|---|---|
| Citric acid, >98% | TCI Singapore |
| Cobalt acetate tetrahydrate, 98% | Alfa Aesar |
| Zinc acetate dihydrate, 98+% ACS | Strem Chemicals |
| Potassium hydroxide, reagent, 98% flakes | Sigma Aldrich |
| Ethanol, >99.8% ACS | VWR |
| Methanol, >99.8% ACS | VWR |

Powder X-ray diffraction. For phase analysis, PXRD patterns with a 2θ range of 5-40° were collected on a Bruker D8 Advance instrument using Cu $K_\alpha$ radiation ($\lambda$=1.5418 Å). The data were collected at a scanning rate of 2°/min. The FWHM data derived for kinetic experiments were collected on a Rigaku Miniflex 600 diffractometer, also using Cu $K_\alpha$ radiation ($\lambda$=1.5418 Å). The patterns were collected from a 2θ range of 5-15° at a scanning rate of 2°/min.

ICP-OES. The metal compositions of mixed-metal UTSA-16 MOFs were analyzed by inductively coupled plasma optical emission spectrometry (ICP-OES, Optima 7300DV, Perkin Elmer). UTSA-16 samples were digested in 5% $HNO_3$ aqueous solution, which allowed complete dissolution of the MOF. The solutions were transferred to low density polyethylene tubes (Fisher Scientific) for further tests.

FTIR-ATR spectroscopy. Fourier-transform infrared attenuated total reflectance (FTIR-ATR) spectra were recorded on a Bruker Vertex 70 spectrometer.

UV-Vis spectroscopy. Solid-state UV-Vis spectra were collected with a Shimadzu UV-2450 spectrophotometer in the range of 400-800 nm using $BaSO_4$ as the standard.

XPS analysis. The photoelectron spectra (XPS) were collected using monochromatized Al $K_\alpha$ radiation (hv=1286.71 eV) at 15 kV on a Kratos Axis Ultra XPS system (Kratos Analytical). The measured binding energies (BEs) were referenced according to C 1 s peak (BE set at 284.5 eV) that corresponds to C—C bonds. The fit of Co high-resolution spectra considered individual peaks for the sites with octahedral coordination environment ($O_h$), the sites with tetrahedral coordination environment ($T_d$), with the remaining contributions lumped into a single satellite signal. The fitting was performed simultaneously for the Co $2p_{3/2}$ and Co $2p_{1/2}$ orbitals after Shirley background subtraction. The peak full width at half maximum (FWHM) was constrained to be equivalent for either orbital, whereas the area ratios were constrained to be 2:1 according to spin-orbit splitting. A similar fitting was undertaken for the Zn 2p region but without the satellite contribution.

TGA experiments. Thermogravimetric analysis (TGA) data were collected using a Shimadzu DTG-60AH under an air flow of 30 mL/min. The samples were heated to 900° C. at a heating rate of 10° C./min.

EXAFS analysis. X-ray absorption fine structure (XAFS) spectra were collected in transmission mode at room temperature at the XAFCA beamline of the Singapore Synchrotron Light Source. The Co and Zn K-edge spectra were processed following the conventional procedure using the IFEFFIT package.

Synthetic and Activation Procedure

General Procedure 1. Solvothermal Synthesis of UTSA-16-Zn-x Materials

UTSA-16(Co) (or UTSA-16-Zn-0) was synthesized with reference to those reported in *Journal of the American Chemical Society* 2005, 127 (47), 16352-16353. Briefly, $Co(OAc)_2 \cdot 4H_2O$ (1 mmol), KOH (3 mmol), and citric acid (1 mmol) were mixed in $H_2O$ (2.5 mL) to yield a homogeneous aqueous solution. The solution was transferred into a Teflon-lined reaction vessel (15 mL). Next, absolute ethanol (2.5 mL) was introduced while manually stirring the vessel contents. To prepare the bimetallic UTSA-16-Zn-x materials, varying amounts of $Co(OAc)_2 \cdot 4H_2O$ were replaced by $Zn(OAc)_2 \cdot 2H_2O$ maintaining the overall stoichiometry of the metal precursor with respect to the ligand and KOH. The reaction mixtures were introduced into a preheated oven (Memmert UF) at 120° C., kept at that temperature for 2 days, and subsequently retrieved and cooled to room temperature. The protocols yield large single crystals (UTSA-16-Co) or powder which was recovered by centrifugation at 5000 rpm and washed with copious amounts of absolute methanol.

General Procedure 2. Growth of UTSA-16-Zn-x Single Crystals

UTSA-16-Zn-x single crystals can be grown at lower temperatures.

To grow UTSA-16-Zn-1.00 single crystals, 500 µL of 0.8 M $Zn(OAc)_2 \cdot 2H_2O$ solution in water was mixed with 500 µL of 0.8 M tripotassium citrate solution in water to yield a clear solution. Then 500 µL of 1 vol.% ethanol in water was added. The homogeneous reaction mixture was transferred to a loosely capped scintillation vial and incubated in a preheated oven at 80° C.

Crystals observable by optical microscope were recovered after approximately 24 h and kept in mother solution prior to SCXRD characterization.

To grow UTSA-16-Zn-0.25 single crystals, 375 µL of 0.8 M $Co(OAc)_2 \cdot 4H_2O$ solution in water was first mixed with 500 µL of 0.8 M tripotassium citrate solution in water. Next, 125 µL of 0.8 M $Zn(OAc)_2 \cdot 2H_2O$ solution in water and 500 µL of 1 vol.% ethanol in water were sequentially added. The same heating and storage protocols were used as UTSA-16-Zn-1.00 (ICP result: 63.3% Co and 36.7% Zn).

It is noted that the single crystal recipe involves an open system where solvent is lost through evaporation. Hence the measured Co/Zn composition may reasonably differ from the feed and differ for different synthetic conditions. In all cases, however, strong preferential occupancy of sites was observed.

General Procedure 3. Activation of UTSA-16-Zn-x Materials

Powder samples were exchanged with fresh methanol daily to dissolve excess ligand or metal precursors. The samples were dried under dynamic vacuum at room temperature for 24 h to yield dry solid products. All samples tested in adsorption measurements were activated (see Examples 6 and 7). For characterization, samples were activated beforehand but may be exposed to environment or solvent in the course of the characterization.

Example 1. Synthesis and Characterization of UTSA-16-Zn-x Materials

Mixed-metal MOF samples containing Co and Zn—denoted as UTSA-16-Zn-x, where x represents the feed molar fraction of Zn in the mixed Zn/Co precursors, and x=0, 0.25, 0.50, 0.75 or 1.00—were prepared by a one-pot synthetic method in accordance with General Procedure 1.

Structural Characterization

Bulk-phase characterization confirms that all of the samples have the same phase. Powder X-ray diffraction (PXRD) measurements confirm a sole crystalline phase identical to that of UTSA-16 (FIG. 2a). Fourier-transform infrared spectroscopy (FTIR) data also confirm the successful synthesis of UTSA-16-type MOFs (FIG. 6). The elemental distributions, as measured by inductively coupled plasma optical emission spectrometry (ICP-OES) against Co and Zn standards, agree well with the feed compositions (Table 2).

In line with the changing sample colour (FIG. 9), XPS and UV-Vis spectroscopy data collectively suggest that the distribution of octahedral-tetrahedral species is a function of metal composition in the mixed-metal MOFs.

The XPS analyses support a decreased $T_d$ spectral contribution relative to $O_h$ when the Zn loading was increased from 0 to 50%.

The band position of octahedral $Co^{2+}$ occurs at approximately 540 nm (suggesting a reddish-pink colour), whereas the band position of tetrahedral $Co^{2+}$ occurs at around 650 nm. F(R) for monometallic Zn compound (x=1.00) is close to zero. F(R) for the monometallic Co compound (x=0) incorporates contributions from both octahedral and tetrahedral Co, consistent with the crystal structure. For the case of x=0.50, the contribution at around λ=625 nm is significantly diminished. This is consistent with a situation whereby $Co_{tet}$ is replaced by $Zn_{tet}$, since the latter has minimal spectral contribution.

The site occupancies within the bulk mixed-metal MOFs were assessed by measuring room temperature extended X-ray absorption fine structure (EXAFS) spectra of mixed-metal samples with varying Zn loadings (x=0, 0.25, 0.50, 0.75, 1.00) at the Co and Zn K-edges. X-ray absorption near edge structure (XANES) spectra (FIG. 10) indicate similar valence state of the samples.

The BET method was used to determine the specific surface areas of the UTSA-16-Zn-x materials. Adsorption data were collected at 77 K. The obtained specific surface areas are listed below in Table 3.

TABLE 2

(Table S.4.1) Calculated Co—Zn ratios for UTSA-16-Zn-x materials from ICP-OES compositional analyses

| Sample | | Measurement | Average | s | x | Average | Feed |
|---|---|---|---|---|---|---|---|
| 1-1 | Co | 12.882 12.875 12.917 ppm | 12.891 | 0.022 | 0.281 | 29.9% | 25% |
| 1-1 | Zn | 5.032 5.019 5.035 ppm | 5.029 | 0.008 | | | |
| 1-2 | Co | 17.998 18.114 18.121 ppm | 18.078 | 0.069 | 0.318 | | |
| 1-2 | Zn | 8.385 8.422 8.426 ppm | 8.411 | 0.022 | | | |
| 2-1 | Co | 9.060 9.037 9.028 ppm | 9.042 | 0.016 | 0.520 | 50.3% | 50% |
| 2-1 | Zn | 9.821 9.793 9.795 ppm | 9.803 | 0.015 | | | |
| 2-2 | Co | 10.677 10.682 10.715 ppm | 10.691 | 0.021 | 0.487 | | |
| 2-2 | Zn | 10.123 10.142 10.128 ppm | 10.131 | 0.010 | | | |
| 3-1 | Co | 5.119 5.156 5.138 ppm | 5.138 | 0.018 | 0.759 | 76.4% | 75% |
| 3-1 | Zn | 16.162 16.205 16.198 ppm | 16.188 | 0.023 | | | |
| 3-2 | Co | 5.018 4.996 5.020 ppm | 5.012 | 0.013 | 0.770 | | |
| 3-2 | Zn | 16.775 16.727 16.740 ppm | 16.747 | 0.025 | | | |
| 4-1 | Co | 0.008 0.006 0.007 ppm | 0.007 | 0.001 | 1.000 | 100.0% | 100% |
| 4-1 | Zn | 15.802 15.767 15.812 ppm | 15.794 | 0.024 | | | |
| 4-2 | Co | 0.006 0.006 0.007 ppm | 0.007 | 0.000 | 1.000 | | |
| 4-2 | Zn | 14.028 14.118 14.031 ppm | 14.059 | 0.051 | | | |

TABLE 3

Calculated BET surface areas of UTSA-16-Zn-x materials

| x | BET S.A. (m$^2$ g$^{-1}$) |
|---|---|
| 0.00 | 691 |
| 0.25 | 791 |
| 0.50 | 863 |
| 0.75 | 670 |
| 1.00 | 834 |

Example 2. Asymmetric Site Distribution of Co and Zn within UTSA-16-Zn-x

The asymmetric site distribution of Co and Zn within UTSA-16-Zn-x is proven using X-ray absorption spectroscopy.

Fourier-transformed EXAFS data at the Co and Zn K-edge for all the MOF samples are shown in FIGS. 2c,d. Overall similarity of the peak profiles in the R range of 0.8-3.2 Å suggests substantially similar coordination environments being adopted by Co and Zn in the mixed-metal MOFs. On the other hand, the peak positions of the mixed-metal samples diverge noticeably across the Co and Zn K-edges (FIG. 2e). The peak maxima fall in the range of 1.59-1.60 Å for the Co K-edge and 1.51-1.53 Å for the Zn K-edge, compared to 1.53(6) and 1.55(4) Å for the respective monometallic MOFs. These are statistically significant deviations ($\Delta R > 0.06$ Å). Since the average bond lengths for tetra-coordinated and hexa-coordinatedcobalt in UTSA-16 differ significantly (FIG. 2b), the concerted displacement of peak positions in opposite directions for either element, amidst a preserved crystalline structure, suggests displacement of Co at a specific site by doping Zn element.

Quantitation of the site distribution based on EXAFS data was performed by simultaneous fitting of Co and Zn K-edges of the mixed-metal samples according to the previous treatment of metal site doping in oxide materials (Physical Review B 2002, 66 (22), 224405). The path amplitudes were parameterized using the fraction of either metallic species occupying the tetrahedral sites, $Y_{Co,tet}$ and $Y_{Zn,tet}$. The amplitude parameters were referenced to the monometallic Co and Zn samples, for which the site occupancy has been established prior by SCXRD (Journal of the American Chemical Society 2005, 127 (47), 16352-16353).

Other parameters are defined as described below. Results of the combined EXAFS fitting of eight independent data sets are shown in FIG. 11, while the values of the obtained fitting parameters are reported in Tables 4 and 5. The fits show satisfactory overall agreement with the experimental data. The obtained $Y_{Co,tet}$ indicates that majority of Co species are situated in the octahedral sites for the mixed-metal samples, whereas $Y_{Zn,tet}$ evidences a strong tetrahedral preference for Zn (FIG. 2f). At x=0.25, Zn occupies 60.3% of tetrahedral sites. This value increases to 84.4% and 93.5% when the x value increases to 0.50 and 0.75, respectively. This strongly indicates an asymmetric site distribution in the mixed-metal materials.

Fit Parameterization

The reported and collected crystal data for UTSA-16 (Co) and UTSA-16 (Zn) were imported and the relevant scattering paths were generated using the FEFF programme. Paths with length below 2.5 Å were considered for the fitting. Four path parameters, $S_0^2$, $E_0$, $\Delta R$, and $\sigma^2$ are considered for each path. The path degeneracy, $N_2$, was kept as specified by the FEFF software.

A single global $E_0$ was specified as a refinable parameter for each edge.

In the monometallic samples, i.e. x=0 and x=1, $S_0^2$ is parameterized as a single refinable parameter. The contribution for the $Co_{tet}$—O and $Co_{oct}$—O single scattering paths were weighted by 0.33 and 0.67 respectively, according to their stoichiometry within the solved crystal structure. For UTSA-16-Zn-x (x=1), an analogous weighting scheme was specified. In the bimetallic samples, the distribution between octahedral and tetrahedral sites in the structure was parameterized as $Y_{Co,tet}$ (x=0.25), $Y_{Zn,tet}$ (x=0.25), etc. and introduced as a weighting factor. These were then referenced to $S_0^t$ of the monometallic samples. In other words, $S_0^2$ of the $Co_{tet}$—O scatterer in x=0.25 is defined as $(S_0^2{}_{,x=0} \times Y_{Co,tet}$ (x=0.25)), whereas $S_0^2$ of the $Co_{oct}$—O scatterer is $[S_0^2{}_{,x=0} \times (1 - Y_{Co,tet}$ (x=0.25))]$.

$\Delta R$ is parameterized as a single refinable parameter for each edge, weighted by the respective $R_{eff}$ of each path.

The Debye-Waller factors of $Co_{tet}$—O, $Co_{oct}$—O, $Zn_{tet}$—O, $Zn_{oct}$—O were reasonably expected to differ, and a single refinable parameter was defined for each.

All the parameters were freely varied during the simultaneous fit of all the eight datasets, resulting in the calculation of the global R-factor.

Fitted $\Delta R$ and $\sigma^2$ converge to physically reasonable values, which are summarized below. Note that the amplitude reduction factor ($S_0^2$) is slightly above the typical range (0.7-1.1) for both edges.

TABLE 4

Parameters obtained by combined fitting of eight datasets at Co and Zn K-edges

| Parameter | Value |
|---|---|
| $N_{ind}$ | 28 |
| $S_{0\ Co}^2$ | 1.176 ± 0.116 |
| $\Delta E_{Co}$, eV | -0.94 ± 1.34 |
| $Y_{Co,tet}$ (X = 0.25) | 0.18 ± 0.07 |
| $Y_{Co,tet}$ (X = 0.50) | 0.12 ± 0.07 |
| $Y_{Co,tet}$ (X = 0.75) | 0.08 ± 0.07 |
| $\Delta R_{Co}$, Å | -0.02 ± 0.01 |
| $\sigma^2$ ($Co_{tet}$—O), Å² | 0.0103 ± 0.0038 |
| $\sigma^2$ ($Co_{oc}t$—O), Å² | 0.0071 ± 0.0011 |
| Global R-factor | 0.0072 |
| $N_{para}$ | 16 |
| $S_{0\ Zn}^2$ | 1.149 ± 0.206 |
| $\Delta E_{Zn}$, eV | 4.96 ± 2.46 |
| $YZ_{n,tet}$ (X = 0.25) | 0.82 ± 0.14 |
| $Y_{Zn,tet}$ (X = 0.50) | 0.65 ± 0.14 |
| $Y_{Zn,tet}$ (X = 0.75) | 0.38 ± 0.13 |
| $\Delta R_{Zn}$, Å | -0.01 ± 0.01 |
| $\sigma^2$ ($Zn_{tet}$—O), Å² | 0.0058 ± 0.0025 |
| $\sigma^2$ ($Zn_{oct}$—O), Å² | 0.0094 ± 0.0036 |

TABLE 5

Individual goodness-of-fit information of eight datasets at Co and Zn K-edges

| Individual R-factors, Co K-edge | | Individual R-factors, Zn K-edge | |
|---|---|---|---|
| x = 0 | 0.01526 | x = 1 | 0.00645 |
| x = 0.25 | 0.00705 | x = 0.25 | 0.00111 |
| x = 0.50 | 0.00827 | x = 0.50 | 0.00169 |
| x = 0.75 | 0.00878 | x = 0.75 | 0.00253 |

Example 3. Synthesis and Characterization of UTSA-16-Zn-0.25 and UTSA-16-Zn-1.00 Materials The further possibility of determining site occupancy by SCXRD arises due to the three-electron difference between Co and Zn incorporated in the samples. To prepare samples of suitable size for the data collection of SCXRD, a modified protocol was adopted. Specifically, large single crystals of UTSA-16-Zn-1.00 and UTSA-16-Zn-0.25 were grown according to General Procedure 2.

The unconstrained refinement of occupancy factors in the octahedral and tetrahedral sites indicates near full occupation of the tetrahedral site by Zn, whereas the Zn occupancy in the octahedral site is approximately 20% for UTSA-16-Zn-0.25. This model agrees well with the diffraction data (see Table 6). The regressed occupancies correspond to a bulk composition of 68.3% Co and 31.7% Zn within the single crystal (ICP result: 63.3% Co and 36.7% Zn).

Single-Crystal X-Ray Diffraction (SCXRD)

Single-crystal X-ray diffraction data of UTSA-16-Zn-1.00 and UTSA-16-Zn-0.25 were collected at 100 K on a Bruker D8 Venture diffractometer. The data integration and reduction were processed with SAINT software. A multi-scan absorption correction was applied to the collected reflections. The structure was solved by the direct method using SHELXTL and was refined on F2 by full-matrix least-squares technique using the SHELXL-2014/7 package within the WINGX programme. All non-hydrogen atoms were refined anisotropically. All hydrogen atoms were located in successive difference Fourier maps and they were treated as riding atoms using SHELXL default parameters. The structures were examined using the Adsym subroutine of PLATON to assure that no additional symmetry could be applied to the models.

TABLE 6

Crystal data and structure refinement for UTSA-16-Zn-1.00 and UTSA-16-Zn-0.25

| Identification code | UTSA-16-Zn-1.00 | | UTSA-16-Zn-0.25 | |
|---|---|---|---|---|
| Empirical formula | $C_{12}H_8KO_{14}Zn_3$ | | $C_{12}H_8KO_{16}Co_{2.05}Zn_{0.95}$ | |
| Formula weight | 611.45 | | 630.21 | |
| Temperature | 100(2) K | | 100(2) K | |
| Wavelength | 0.71073 Å | | 0.71073 Å | |
| Crystal system | Tetragonal | | Tetragonal | |
| Space group | 1-4 2 d | | 1-4 2 d | |
| Unit cell dimensions | a = 12.8873(10) Å | α = 90°. | a = 12.7869(6) Å | α = 90°. |
| | b = 12.8873(10) Å | β = 90°. | b = 12.7869(6) Å | β = 90°. |
| | c = 30.445(4) Å | γ = 90°. | c = 30.2946(12) Å | γ = 90°. |
| Volume | 5056.4(10) Å³ | | 4953.3(5) Å³ | |
| Z | 8 | | 8 | |
| Density (calculated) | 2.203 Mg/m³ | | 1.691 Mg/m³ | |
| Absorption coefficient | 3.608 mm⁻¹ | | 2.512 mm⁻¹ | |
| F(000) | 3384 | | 2488 | |
| Theta range for data collection | 2.555 to 29.903°. | | 2.57 to 28.4°. | |
| Index ranges | -18 <= h <= 18, | | -17 <= h <= 16, | |
| | -18 <= k <= 18, | | -16 <= k <= 17, | |
| | -42 <= l <= 36 | | -40 <= l <= 40 | |
| Reflections collected | 53272 | | 24136 | |
| Independent reflections | 3662 [R(int) = 0.1718] | | 3111 [R(int) = 0.0595] | |
| Refinement method | Full-matrix least-squares on F² | | Full-matrix least-squares on F² | |
| Data/restraints/parameters | 3662/0/127 | | 3111/0/149 | |

TABLE 6-continued

Crystal data and structure refinement for UTSA-16-Zn-1.00 and UTSA-16-Zn-0.25

| Identification code | UTSA-16-Zn-1.00 | UTSA-16-Zn-0.25 |
|---|---|---|
| Goodness-of-fit on F2 | 0.951 | 0.981 |
| Final R indices [I>2sigma(I)] | R1 = 0.0570, wR2 = 0.1377 | R1 = 0.0263, wR2 = 0.0555 |
| R indices (all data) | R1 = 0.0710, wR2 = 0.1452 | R1 = 0.0315, wR2 = 0.0576 |
| Identification code | UTSA-16-Zn-1.00 | UTSA-16-Zn-0.25 |
| Absolute structure parameter | 0.014(12) | 0.016(8) |
| Largest diff. peak and hole | 1.524 and -0.669 e.Å$^{-3}$ | 0.34 and -0.35 e.Å$^{-3}$ |

Example 4. Effect of Zn Loading on Temperature-Dependent Crystallization

Temperature-dependent crystalization of UTSA-16(Co) (viz. UTSA-16-Zn-0) and UTSA-16-Zn-0.50 were compared.

Temperature-Dependent Crystallization

The reaction mixtures (corresponding to UTSA-16-Zn-0 and UTSA-16-Zn-0.50) were prepared in accordance with General Procedure 1 except that the heating was done for 24 h in preheated ovens at the defined temperatures (60, 80, 100° C.), or at room temperature (25° C.).

The samples were recovered by centrifugation at 5000 rpm, washed with copious amounts of absolute MeOH before being dried in a vacuum oven for PXRD tests. Due to significant Co content in the samples, the samples exhibited high signal-to-noise ratio owing to X-ray absorption when using Cu Kα radiation source (Rigaku Miniflex). Hence, the samples were background-subtracted and filtered by Savitsky-Golay function using instrument-accompanying processing software (Rigaku PDXL). The same processing method was performed for all samples in FIGS. 3a and 3b. The intensity metrics for samples of different compositions are not directly comparable because of the absorption phenomena.

Results

In the case of the monometallic parent MOF (UTSA-16-Zn-0), a sticky gel was deposited from which violet prismatic crystals emerged. XRD patterns collected on products crystallized from incubation for 24 h at 25, 60, 80, and 100° C. (FIG. 3a) indicate that the solids obtained at low temperatures (25 and 60° C.) are primarily amorphous. When the temperature increased to 80° C., peaks corresponding to UTSA-16 arose after 24 h. At 100° C., large single crystals observable by optical microscope began to form (FIG. 5). For UTSA-16-Zn-0.50, characteristic PXRD peaks may be observed even by standing the reaction mixture at room temperature for 24 h (FIG. 3b).

Example 5. Effect of Zn Loading on Induction Time

The effect of Zn loading on the formation kinetics was estimated by ex-situ PXRD studies. The MOF formation kinetics was estimated by the inverse of the full-width at half-maximum (FWHM) of the dominant PXRD peak at ca. 7.5°, which was further normalized by the long-time average for comparability across different Zn loadings.

Method

For accurate estimation of induction time, the composition was optimized to ensure a homogeneous starting solution. In light of salting-out effects, it is necessary to balance the solvent composition to suppress liquid-liquid phase separation. Here, a starting solution of M$^{II}$(acetate)-K$_3$(citrate) (0.4 M in 15 vol % aqueous EtOH solution) was used.

The final composition of a 10 mL solution comprises 1.5 mL EtOH, 8.5 mL H$_2$O, 4 mmol of M$^{II}$(acetate), and 4 mmol of citric acid neutralized with 12 mmol KOH. The 4 mmol of M$^{II}$(acetate) will be further apportioned into the two metals, keeping all other reagent quantities constant. For example, a 50/50 solution (x=0.5) may be prepared with 2 mmol of Co(OAc)$_2$·4H$_2$O and 2 mmol of Zn(OAc)$_2$·2H$_2$O with 4 mmol of citric acid neutralized with 12 mmol KOH in 5 mL H$_2$O as solvent. Then, 1.5 mL EtOH+3.5 mL H$_2$O solution is added to start the experiment. Different relative amounts of Co/Zn can be prepared by varying the relative ratio of M$^{II}$(acetate) without changing the total molar amount. For example, 25/75 (x=0.75) and 75/25 (x=0.25) mixtures can be prepared using 1 mmol of Co(OAc)$_2$·4H$_2$O and 3 mmol of Zn(OAc)$_2$·2H$_2$O or 3 mmol of Co(OAc)$_2$·4H$_2$O and 1 mmol of Zn(OAc)$_2$·2H$_2$O, respectively. The concentration of EtOH is strongly correlated with solid precipitation; to avoid immediate formation of solid, EtOH was added as a dilute solution (<30%) in water. The samples were incubated in a preheated oven at 65° C., removed at fixed intervals and ice quenched. The products were centrifuged (8,000 rpm for 3 min), dried under vacuum at room temperature, and subject to PXRD measurements. The time for products recovery was minimized and kept constant between samples with different Zn loadings. For samples with no solid isolated after the centrifugation, the FWHM is reported as 0.

Results

FIG. 3c indicates the induction time, defined as the time where the product shows noticeable crystallinity, decreases noticeably as the Zn content in the system is increased.

Even a modest Zn loading (x=0.25) can greatly reduce the induction time to around 70 min These results inform a certain feasibility to obtain mixed-metal UTSA-16 materials at ambient pressure within reasonable synthetic durations (<48 h).

In FIG. 3c, the experiments are performed at T=65° C. The product crystallizes in less than 1 hour. This temperature is below the boiling point of the solvent, which allows the reaction to be operated at ambient pressure using a simple reflux setup. It is apparent from FIG. 3c that the reaction time can be manipulated by adjusting the structure composition. This property can be used to manipulate other parameters beyond reaction time, such as temperature, by accommodating appropriate process trade-offs.

Example 6. Carbon Capture Performance of UTSA-16-Zn-x

Gas Sorption Experiments

The gas isotherms were measured up to 1 bar using a Micromeritics ASAP 2020 surface area and pore size analyzer. Before the measurements, the samples were degassed under reduced pressure (<10⁻² Pa) at 150° C. until the outgas rate was below 5 μm Hg/min. UHP grade $N_2$ and $CO_2$ were used for gas sorption measurements. Oil-free vacuum pumps and oil-free pressure regulators were used to prevent contamination of the samples during the degassing process and isotherm measurement. The temperatures of 77, 273, and 298 K were maintained with a liquid nitrogen bath, an ice water bath, and under room temperature, respectively.

Fitting of $CO_2$ Isotherms

Measured $CO_2$ isotherms were fitted using the dual-site Langmuir Freundlich (DSLF) isotherm model, $$q = \frac{q_{sat,A} b_A p^{\alpha_A}}{1+b_A p^{\alpha_A}} + \frac{q_{sat,B} b_B p^{\alpha_B}}{1+b_B p^{\alpha_B}} \quad \text{Eq. 1}$$

The model accounts for site inhomogeneity by defining two adsorption sites A and B with distinct saturation capacities and affinity parameters.

Here, q is the amount of adsorbed gas, $q_{sat}$ is the amount of gas adsorbed at saturation (mmol g⁻¹), b is the Langmuir-Freundlich affinity parameter (kPa⁻¹), and a is a dimensionless exponent.

The simultaneous fitting at 298 K and 273 K was performed by inbuilt Solver function in Microsoft Excel, where the temperature dependence is described by independent b terms.

TABLE 7

| DSLF isotherm parameters for UTSA-16-Zn-x materials |
| --- |

| x | $q_{sat,A}$ | $b_{A,298}$ | $b_{A,273}$ | $\alpha_A$ | $q_{sat,B}$ | $b_{B,298}$ | $b_{B,273}$ | $\alpha_B$ |
| --- | --- | --- | --- | --- | --- | --- | --- | --- |
| 0.25 | 2.367 | 0.028 | 0.222 | 1.528 | 2.754 | 0.028 | 0.064 | 0.684 |
| 0.50 | 2.158 | 0.029 | 0.220 | 1.530 | 2.752 | 0.029 | 0.064 | 0.681 |
| 0.75 | 2.173 | 0.030 | 0.237 | 1.514 | 2.706 | 0.030 | 0.067 | 0.678 |
| 1.00 | 2.449 | 0.027 | 0.213 | 1.562 | 2.716 | 0.027 | 0.063 | 0.703 |

Fitting of $N_2$ Isotherms

Measured $N_2$ isotherms were fitted using the single-site Langmuir (SSL) isotherm model, $$q = \frac{q_{sat} b p}{1+bp} \quad \text{Eq. 2}$$

Due to low curvature of the isotherms, independent fitting for samples with different Zn loadings led to large variance in the obtained parameters. To reduce the number of free parameters, the $q_{sat}$ values of the individual UTSA-16-Zn-x sample were restrained to a common value scaled by their $N_2$ uptake at 100 kPa. This restraint is supported by the substantial agreement of the isotherms, their isostructural nature, and very similar adsorption behaviour with respect to $CO_2$.

TABLE 8

| SSL isotherm parameters for UTSA-16-Zn-x materials |
| --- |

| x | $q_{sat}$ (mmol g⁻¹) | b (kPa⁻¹) |
| --- | --- | --- |
| 0.25 | 1.3322 | 0.00156 |
| 0.50 | 1.1947 | 0.00166 |

TABLE 8-continued

| SSL isotherm parameters for UTSA-16-Zn-x materials |
| --- |

| x | $q_{sat}$ (mmol g⁻¹) | b (kPa⁻¹) |
| --- | --- | --- |
| 0.75 | 1.2387 | 0.00153 |
| 1.00 | 1.2599 | 0.00154 |

Results

Single component $CO_2$ and $N_2$ isotherms were collected for UTSA-16-Zn-x at 273 and 298 K. The shape of $CO_2$ isotherms and total uptake of $CO_2$ at 1 bar are substantially similar to that of the parent Co one. In addition, several other parameters obtained by analysing the isotherms, such as isosteric heat of $CO_2$ adsorption ($Q_{st}$) and $CO_2/N_2$ selectivity calculated by ideal adsorbed solution theory (IAST) are also identical (FIG. 4; FIG. 7; and Table 9), suggesting similar $CO_2$ capture performance between UTSA-16-Zn-x and UTSA-16(Co).

TABLE 9

| Summary of performance metrics for adsorptive $CO_2$ capture at 298K |
| --- |

| x | 0.25 | 0.50 | 0.75 | 1.0 |
| --- | --- | --- | --- | --- |
| $CO_2$ uptake (mmol g⁻¹) | 3.39 | 3.18 | 3.20 | 3.50 |
| -$Q_{st}$ (kJ mol⁻¹) | 35.4 | 34.3 | 35.3 | 34.8 |
| IAST $CO_2/N_2$ selectivity 1 bar, 15:85 feed | 190 | 206 | 212 | 228 |

Example 7. Competitive Adsorption of UTSA-16-Zn-x Under Dynamic Conditions

Breakthrough experiments were also performed using simulated flue gas (15/85 $CO_2/N_2$ feed) to analyze competitive adsorption under dynamic conditions.

Breakthrough Experiments

The breakthrough experiments were conducted using a home-built setup shown in FIG. 12. The MOF samples (700 to 900 mg) were packed into a stainless-steel column (L=7 cm, D=0.46 cm) and held in place using quartz wool and steel mesh.

The feed flow rates during the experiment were controlled using mass flow controllers (error: 0.1 sccm). The total flow rate through the column was set to 3 sccm. These were stabilized using a bypass line and switched to flow through the adsorbent column immediately prior to the experiment.

The gas composition at the exit of the column was determined by a mass spectrometer (Hiden QGA). To precisely determine the flow rates, Ar was introduced at a fixed flow rate of 3 sccm to the effluent gas as an internal reference to calibrate the mass flow rate. The upstream and downstream pressures were recorded. The original breakthrough plots were obtained as relative compositions vs. elapsed time and then converted to mole fraction normalized with the mole fraction at the inlet vs. elapsed time plots.

The performance evaluation is based on 3 experiments:

Dry Feed (RH=0%)—

The column was activated by purging a constant He flow of 10 sccm through the column at 120° C. for 24 h. The feed gas was a (15±1)/(85±1) $CO_2/N_2$ mixture prepared by mixing dry gas upstream of the column.

Wet Feed (RH=85%)—

The column was activated by purging a constant He flow of 10 sccm through the column at 120° C. for 24 h. The feed gas was a (15±1)/(85±1) $CO_2/N_2$ mixture with relative humidity of around 85%; the moisture was introduced by passing the $N_2$ stream through a water bubbler at room temperature prior to mixing.

Water-Saturated Sorbent Bed (Sat. Col.)—

The column was activated by purging a constant He flow of 10 sccm through the column at 120° C. for 24 h. For pre-saturation, a wet purge stream was prepared by passing a $N_2$ stream through a water bubbler at room temperature prior to mixing. The purge stream was sent through the column for 72 h until a stable water signal was detected by the mass spectrometer. Then, the column was briefly activated under constant He flow (10 sccm) at room temperature. This condition has been observed by us to enable near complete desorption of $N_2/CO_2$ but minimal desorption of adsorbed $H_2O$. The experiment was then performed using 'wet feed' conditions. Under these conditions, the MOF-packed columns showed negligible uptake for either component.

The mean residence time within the adsorption column was obtained by performing a mass balance using the inlet and exit gas molar flow rates, i.e.

$$\bar{t} = \int_0^{\tau} \left(1 - \frac{F_t}{F_0}\right) dt \quad \text{Eq. 3}$$

The obtained residence time was corrected by the residence time of a control experiment using a blank tube under the same pressure drop and feed conditions. The validity of this correction depends on a linear additive relationship for retention time and band broadening characteristics of the experiment. Uncorrected breakthrough curves (FIG. 13) and obtained residence time after correction are presented in Table 10).

Results

The saturated $CO_2$ uptakes of UTSA-16-Zn-x are in the range of 1.65–1.70 mmol $g^{-1}$ with substantial tolerance to moisture (FIG. 4). These are slightly lower than that of the parent Co MOF (1.82 mmol $g^{-1}$), in similar fashion to the static $CO_2$ uptake results.

The maximum productivity of $CO_2$ ($q_{max}$) is in good agreement with the single-component static uptake (1.8 mmol $g^{-1}$ and 1.94 mmol $g^{-1}$ respectively for x=0.5 and 1). In general, there is a slightly lower capacity (−2.3%) when transiting from dry to RH=85% feed, due to competitive adsorption by $H_2O$.

TABLE 10

Obtained dynamic adsorption parameters from column breakthrough measurements

| Run | $\bar{t}_{CO2}$ min $g^{-1}$ | $q_{CO2,max}$ mmol $g^{-1}$ |
| --- | --- | --- |
| x = 0, RH = 0% | 96.5 | 1.86 |
| x = 0, RH = 85% | 91.8 | 1.84 |
| x = 0.5, RH = 0% | 84.02 | 1.69 |
| x = 0.5, RH = 85% | 81.91 | 1.65 |
| x = 1, RH = 0% | 84.47 | 1.70 |
| x = 1, RH = 85% | 82.4 | 1.66 |

SUMMARY

In summary, we have shown that the replacement of rate-limiting tetrahedral Co species within UTSA-16 by Zn can dramatically accelerate the formation kinetics of these MOFs, affording mild synthetic conditions suitable for the mass production of those materials. The new UTSA-16-type MOFs exhibit $CO_2$ capture performance identical to that of the parent Co one, with substantial tolerance to moisture.

The invention yields mixed-metal composites from a known binary (single metal/single linker) MOF with suitable structure, which possess improved synthetic robustness compared to the monometallic materials. Optimized protocols derived from this strategy are more compatible with scaled-up production, which will accelerate the process development of the concerned materials for various commercial applications.

The invention claimed is:

1. A metal organic framework (MOF) having a UTSA-16 structure, where the MOF comprises a first metal selected from one or more of the group consisting of Cr, Fe, Ni, Cu, and Co, wherein the first metal represents up to 80 mol % of the total metal in the MOF; and from 20 to 80 mol % of the total metal in the MOF is a second metal selected from one or more of the group consisting of Cd, Mn, and Zn, wherein the MOF comprises tetrahedral metal sites and a majority of the second metal occupies the tetrahedral metal sites within the MOF.

2. The MOF according to claim 1, wherein the second metal is Zn.

3. The MOF according to claim 1, wherein the second metal is present in an amount of from 50 to 75 mol % of the total metal present in the MOF.

4. The MOF according to claim 1, wherein the first metal is selected from Fe and Co.

5. The MOF according to claim 1, wherein the first metal is Co.

6. The MOF according to claim 1, wherein the first metal is present in an amount of from 25 to 50 mol % of the total metal present in the MOF.

7. The MOF according to claim 1, wherein the MOF comprises octahedral metal sites and a majority of the first metal occupies the octahedral metal sites within the MOF.

8. The MOF according to claim 1, wherein the MOF has a saturated $CO_2$ uptake of up to 5.0 mmol/g.

9. The MOF according to claim 1, wherein the MOF has a breakthrough $CO_2$ working capacity of up to 2.2 mmol/g.

10. A method of capturing $CO_2$ comprising the step of exposing a material comprising a MOF as described in claim 1 to an environment containing $CO_2$.

11. The MOF according to claim 1, wherein 51 mol % or more of the second metal occupies the tetrahedral metal sites within the MOF.

12. The MOF according to claim 1, wherein 60 mol % of the second metal occupies the tetrahedral metal sites within the MOF.

13. A method of forming the MOF of claim 1, the method comprising:
 aging a mixture comprising a first metal precursor, a second metal precursor, a base, citric acid, a first solvent, and a second solvent for a period of time at a temperature of 15° C. to 200° C.,
 wherein the first metal precursor comprises a first metal that is selected from Cr, Fe, Ni, Cu, Co, and any combination thereof,
 wherein the second metal precursor comprises a second metal that is selected from Cd, Mn, Zn, and any combination thereof,
 wherein the first metal is present in an amount up to 80 mol % of the total amount of metal in the mixture, and wherein the second metal is present in an amount from 20 to 80 mol % of the total amount of metal in the mixture.

14. The method of claim 13, wherein the temperature is from 20 to 150° C.

15. The method of claim 13, wherein the temperature is from 40 to 120° C.

16. The method of claim 13, wherein the temperature is from 60 to 80° C.

17. The method of claim 13, wherein:
   (a) the first solvent is water and the second solvent is an alkyl alcohol;
   (b) the base is a metal hydroxide; and/or
   (c) the method is performed under ambient atmospheric conditions.

18. The method of claim 13, wherein the first and second metal precursors are each a metal salt, wherein the first and second metals in the metal salt are each in a cationic form that is balanced by one or more counterions that are each independently selected from a halide, nitrate, sulfate, hydroxide, oxide, acetate anion, hydrate, and any combination thereof.

19. The method of claim 13, wherein:
   (a) the second metal precursor is $Zn(OAc)_2$ or a hydrate thereof; and/or
   (b) the second metal in the second metal precursor is present in an amount of from 50 to 75 mol % of the total amount of metal in the mixture.

20. The method of claim 13, wherein:
   (a) the first metal precursor is $Fe(OAc)_2$, $Co(OAc)_2$ or a hydrate thereof; and/or
   (b) the first metal in the first metal precursor is present in an amount of from 25 to 50 mol % of the total amount of metal in the mixture.

* * * * *

UNITED STATES PATENT AND TRADEMARK OFFICE
CERTIFICATE OF CORRECTION

PATENT NO. : 11,896,951 B2
APPLICATION NO. : 17/998510
DATED : February 13, 2024
INVENTOR(S) : Zhao et al.

It is certified that error appears in the above-identified patent and that said Letters Patent is hereby corrected as shown below:

In the Specification

Column 3, Line 63: correct "·4H$_2$" to read --·4H$_2$O--

Column 4, Line 35: correct "00$_2$/N$_2$" to read --CO$_2$/N$_2$--

Column 8, Line 9: correct "Co$^{\parallel}$" to read --Co$^{II}$--

Column 9, Line 14: correct "Co$^{\parallel}$" to read --Co$^{II}$--

Column 9, Line 16: correct "Co$^{\parallel}$" to read --Co$^{II}$--

Column 9, Line 21: correct "Zn$^{\parallel}$" to read --Zn$^{II}$--

Column 9, Line 23: correct "Zn$^{\parallel}$" to read --Zn$^{II}$--

Column 12, Line 59: correct "S$_0$" to read --S$_0^2$--

Column 13, Line 27, Table 4: correct "YZ$_{n,tet}$ (X= 0.25)" to read --Y$_{Zn,tet}$ (X = 0.25)--

Column 14, Table 6, Space group row: correct "Space group 1 -4 2 d
1 -4 2 d" to read --Space group I -4 2 d
I -4 2 d--

Column 15, Table 6: correct "Goodness-of-fit on F2" to read --Goodness-of-fit on F$^2$--

Column 15, Table 6: correct "Final R indices [1>2sigma(I)]" to read --Final R indices [I>2sigma(I)]--

Column 16, Line 14: correct "M$^{\parallel}$(acetate)" to read --M$^{II}$(acetate)--

<div style="text-align: right;">

Signed and Sealed this
Twenty-fifth Day of June, 2024

Katherine Kelly Vidal
*Director of the United States Patent and Trademark Office*

</div>

Column 16, Line 17: correct "M$^{\|}$(acetate)" to read --M$^{II}$(acetate)--

Column 16, Line 19: correct "M$^{\|}$(acetate)" to read --M$^{II}$(acetate)--

Column 16, Line 27: correct "M$^{\|}$(acetate)" to read --M$^{II}$(acetate)--